(12) United States Patent
Chung

(10) Patent No.: US 11,839,972 B2
(45) Date of Patent: Dec. 12, 2023

(54) PERSONAL MOBILITY DEVICE

(71) Applicant: Caleb Chung, Boise, ID (US)

(72) Inventor: Caleb Chung, Boise, ID (US)

(*) Notice: Subject to any disclaimer, the term of this patent is extended or adjusted under 35 U.S.C. 154(b) by 870 days.

(21) Appl. No.: 16/883,528

(22) Filed: May 26, 2020

(65) Prior Publication Data

US 2020/0375826 A1 Dec. 3, 2020

Related U.S. Application Data

(60) Provisional application No. 62/853,232, filed on May 28, 2019.

(51) Int. Cl.
*B25J 9/10* (2006.01)
*B25J 9/06* (2006.01)
*B25J 9/16* (2006.01)
*B25J 9/00* (2006.01)

(52) U.S. Cl.
CPC ............ *B25J 9/102* (2013.01); *B25J 9/0009* (2013.01); *B25J 9/106* (2013.01); *B25J 9/162* (2013.01)

(58) Field of Classification Search
CPC ... B25J 9/102; B25J 9/0009; B25J 9/06; B25J 9/106; B25J 9/162
See application file for complete search history.

(56) References Cited

U.S. PATENT DOCUMENTS

| 5,772,237 A * | 6/1998 | Finch | B60G 21/023 280/43.23 |
| 8,469,383 B2 * | 6/2013 | Zhou | A61G 5/1078 180/209 |
| 8,850,636 B2 * | 10/2014 | Gray | A61G 7/1098 5/81.1 R |
| 8,851,214 B2 * | 10/2014 | Mirzaie | A61G 5/043 180/907 |
| 10,259,498 B2 * | 4/2019 | Jägenstedt | B62D 12/00 |
| 11,498,205 B2 * | 11/2022 | Svensson | B62D 7/023 |

\* cited by examiner

*Primary Examiner* — Jacob D Knutson
(74) *Attorney, Agent, or Firm* — PARSONS BEHLE & LATIMER

(57) ABSTRACT

A mobility device having a body, a plurality of arms, and a control module operable to control the angular positions of the plurality of arms and the body. The body includes a first side, a second side, a front end, a rear end, a first frame rotatable about a first axis, and a second frame rotatable about a second axis. The first axis is parallel to the second axis. Rotation of the first frame causes simultaneous rotation of the second frame in the opposite direction. Arms are rotatably supported on the first side of the body and other arms are rotatably supported on the second side of the body. Each arm includes a wheel. The arms are independently rotatable from the other arms.

20 Claims, 15 Drawing Sheets

| $\alpha_1$ | $\alpha_2$ | $\beta_1$ | $\beta_2$ | $\beta_3$ | $\beta_4$ |
|---|---|---|---|---|---|
| 0 | 0 | − | − | + | + |

PERSONAL MOBILITY DEVICE

RELATED APPLICATION DATA

The present application claims the benefit of priority under 35 U.S.C. § 119 to U.S. Provisional Application No. 62/853,232 filed May 28, 2019, entitled "Personal Mobility Device," the disclosure of which is incorporated herein by reference in its entirety.

FIELD OF THE DISCLOSURE

The embodiments described herein relate generally to mobility devices. More specifically, the embodiments described herein relate to a self-balancing mobility device for transporting a person or cargo.

BACKGROUND

Description of the Related Art

Personal mobility devices, such as electric wheelchairs, may be used to overcome physical limitations of a person. However, known mobility devices are limited in their ability to traverse uneven surfaces. In addition, known mobility devices may be expensive. Some known mobility devices have limited maneuverability and may be slow to adapt to terrain. Other disadvantages of known mobility devices exist.

SUMMARY

An embodiment of a mobility device includes a body, a body motor, a plurality of arms, at least one arm motor, a plurality of wheels, and a plurality of wheel motors. The body includes a front end, a rear end, a first frame, a second frame, and a length extending from the front end to the rear end. The rear end is located on the first frame. The front end is located on the second frame. The first frame is rotatable about a first axis extending through the first frame. The second frame is rotatable about a second axis extending through the second frame.

The body motor is operable to rotationally drive the first frame and the second frame. The plurality of arms are rotatably supported on the body. Each arm includes a first end and a second end. Each arm is rotatable with respect to the body about a respective arm axis. The at least one arm motor is operable to independently rotate the plurality of arms about their respective arm axis. The plurality of wheels is supported upon the second ends of the plurality of arms. Each wheel motor is operable to drive a respective one of the plurality of wheels.

The first frame and the second frame may be rotatably linked such that rotation of the first frame causes rotation of the second frame in an opposite direction. The plurality of arms may include at least four arms. Two of the four arms are supported upon the first frame. The other two of the four arms are supported upon the second frame. The plurality of arms may be exactly four arms.

The first axis may be perpendicular to the length of the body. The arm axis of each of the plurality of arms supported upon the first frame may be perpendicular to the first axis. The at least one arm motor may be a plurality of arm motors, each arm motor operable to rotate a respective one of the plurality of arms about the arm axis at the first end of the arm.

The first frame may include a first gear profile. The second frame may include a second gear profile meshed with the first gear profile. Rotational motion of either the first frame or the second frame induces rotational motion of the other of the first frame and the second frame. The first gear profile has a first radius of curvature about the first axis and the second gear profile has a second radius of curvature about the second axis. The first radius of curvature may be equal to the second radius of curvature.

An embodiment of a mobility device includes a base, a first frame, a second frame, a body motor, a first pair of arm shafts, a second pair of arm shafts, a plurality of arms, a plurality of arm motors, a plurality of wheels, a plurality of wheel motors, and a control module.

The base includes a first end, a second end, and a length extending from the first end to the second end. The first frame is affixed to a first driveshaft and the first driveshaft is rotatably supported upon the base along a first axis closer to the first end than the second end of the base. The second frame is affixed to a second driveshaft and the second driveshaft is rotatably supported upon the base along a second axis closer to the second end than the first end of the base.

The body motor is operable to rotationally drive the first frame and the second frame. The first pair of arm shafts are rotatably supported on opposing sides of the first frame. The second pair of arm shafts are rotatably supported on opposing sides of the second frame. The plurality of arms includes a first arm rotationally linked to a first arm shaft of the first pair of arm shafts, a second arm rotationally linked to a second arm shaft of the first pair of arm shafts, a third arm rotationally linked to a third arm shaft of the second pair of arm shafts, and a fourth arm rotationally linked to a fourth arm shaft of the second pair of arm shafts.

The plurality of arm motors includes a first arm motor mechanically linked to the first arm shaft, a second arm motor mechanically linked to the second arm shaft, a third arm motor mechanically linked to the third arm shaft, and a fourth arm motor mechanically linked to the fourth arm shaft. The plurality of wheels includes a first wheel rotatably supported upon the first arm, a second wheel rotatably supported upon the second arm, a third wheel rotatably supported upon the third arm, and a fourth wheel rotatably supported upon the fourth arm.

The plurality of wheel motors are operable to drive the plurality of wheels. The plurality of wheel motors includes a first wheel motor mechanically linked to the first wheel, a second wheel motor mechanically linked to the second wheel, a third wheel motor mechanically linked to the third wheel, and a fourth wheel motor mechanically linked to the fourth wheel. The control module is logically linked to the body motor, the plurality of arm motors, and the plurality of wheel motors.

The first axis may be parallel to the second axis. The body motor may include a drive gear and the first frame may include an arcuate rack meshed with the drive gear. The arcuate rack includes a radius of curvature about the first axis. Rotation of the drive gear induces rotation of the first frame with respect to the base.

The first frame may include a first gear profile and the second frame may include a second gear profile meshed with the first gear profile. The first gear profile has a first radius of curvature about the first axis and the second gear profile has a second radius of curvature about the second axis, the first radius of curvature being equal to the second radius of curvature.

The second frame may include a cover portion extending over the first frame. The mobility device may include a seat mounted on the cover portion. The mobility device may include a set of direct controls in communication with the control module. The mobility device may include one or more pressure transducers beneath the seat in communication with the control module. The control module may be configured to modify operation of at least one of the body motor, the plurality of arm motors, and the plurality of wheel motors based upon measurements of the one or more pressure transducers.

The mobility device may include a memory module including a stored function. The stored function includes a sequence of movements of the plurality of arms, the first frame, and the second frame. The mobility device may include a communications module operable to receive commands from a remote location and relay those commands to the control module. The mobility device may include an audiovisual system including a display, speakers, a camera, and a microphone.

An embodiment of a mobility device includes a body, a plurality of arms, and a control module. The body includes a first side, a second side, a front end, a rear end, a first frame rotatable about a first axis, and a second frame rotatable about a second axis. The first side is opposite the second side. The front end is opposite the rear end. The first axis is parallel to the second axis. The first frame and the second frame are rotatably linked such that rotation of the first frame causes simultaneous rotation of the second frame in the opposite direction.

The plurality of arms includes a first plurality of arms rotatably supported on the first side of the body and a second plurality of arms rotatably supported on the second side of the body. Each arm of plurality of arms includes a wheel. Each arm of the plurality of arms is independently rotatable from the other arms of the plurality of arms. The control module is operable to control angular positions of the plurality of arms, the first frame, and the second frame.

Figure 1:
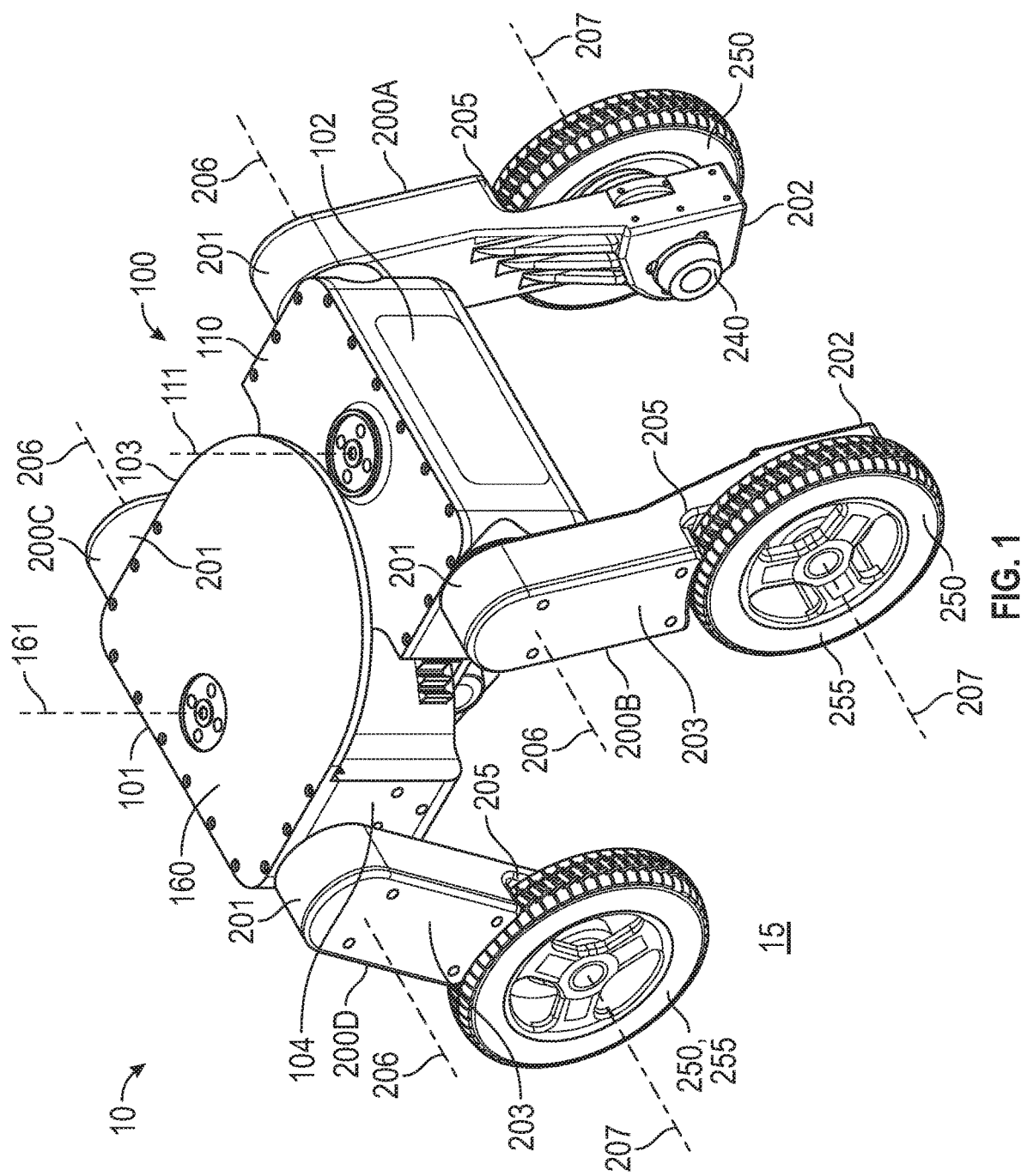
FIG. 1 shows an embodiment of a mobility device.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of a mobility device 10. Mobility device 10 includes a body 100 and a plurality of arms. The plurality of arms may be at least four arms including a first arm 200A, a second arm 200B, a third arm 200C, and a fourth arm 200D (collectively and individually referred to as arm 200). The plurality of arms 200 may be exactly four arms 200. The number of arms 200 may be equally distributed on opposing sides 103, 104 of body 100. In some embodiments, the plurality of arms 200 may be more than four arms. Each arm 200 includes a first end 201, a second end 202, and a wheel 250. Arm 200 is rotatably supported upon body 100 at first end 201 of arm 200 and is rotatable about an arm axis 206. Arm axis 206 may be parallel to a flat surface 15 upon which wheel 250 would roll and may be perpendicular to a length of body 100 that extends from a front end 101 to a rear end 102 of body 100. Wheels 250 may be interchangeable with different sizes and treads. Wheels 250 may have a diameter greater than 14" to increase the ability to traverse stairs. In some embodiments, wheels 250 may be airless tires such as Tweel® tires manufactured by the Michelin Company of Clermont-Ferrand, France. Wheel 250 is rotatably disposed about an axis 207 at second end 202 of arm 200. Axis 207 may be parallel to arm axis 206. Second end 202 may include a recess 205 shaped to house wheel 250. An outer sidewall 255 of wheel 250 may not extend beyond an outer side 203 of arm 200. A wheel motor 240 is mechanically linked to wheel 250. In some embodiments, wheel 250 is keyed directly to an output shaft of wheel motor 240. Wheel motor 240 may be disposed within arm 200.

Body 100 includes a rear end 102 and a front end 101 opposite rear end 102. Body 100 may be formed of a first frame 110, a second frame 160, and a base 150 (shown in FIG. 3). Base 150 may include a bottom plate 156 and a top plate 157. Base 150 provides a structure to support first frame 110, second frame 160, and a drivetrain 300 (shown in FIG. 2). The number of arms 200 may be equally distributed on first frame 110 and second frame 160 of body 100. Rear end 102 of body 100 is located on first frame 110.

Front end 101 of body 100 is located on second frame 160. First frame 110 is rotatable about an axis 111 and second frame 160 is rotatable about an axis 161. Axis 111 is parallel to axis 161. Axis 111 is perpendicular to arm axis 206. Arm axis 206 of first arm 200A may be aligned with arm axis 206 of second arm 200B. Arm axis 206 of third arm 200C may be aligned with arm axis 206 of fourth arm 200D.

First arm 200A and second arm 200B are rotatably disposed on first frame 110. Arm axis 206 of first arm 200A and arm axis 206 of second arm 200B may each intersect with axis 111. Third arm 200C and fourth arm 200D are rotatably disposed on second frame 160. Arm axis 206 of third arm 200C and arm axis 206 of fourth arm 200D may each intersect with axis 161. First arm 200A and third arm 200C form a first pair of arms rotatably supported on a first side 103 of body 100. Second arm 200B and fourth arm 200D form a second pair of arms rotatably supported on a second side 104 of body 100.

First frame 110 and second frame 160 may be rotatably linked. When one of first frame 110 or second frame 160 is rotated about their respective axis 111, 161, the other is simultaneously rotated about its respective axis 111, 161 in the opposite direction. First frame 110 and second frame 160 may be rotatably linked such that the rate of rotation of first frame 110 is equal to the rate of rotation of second frame 160 except in the opposite direction.

Figure 2:
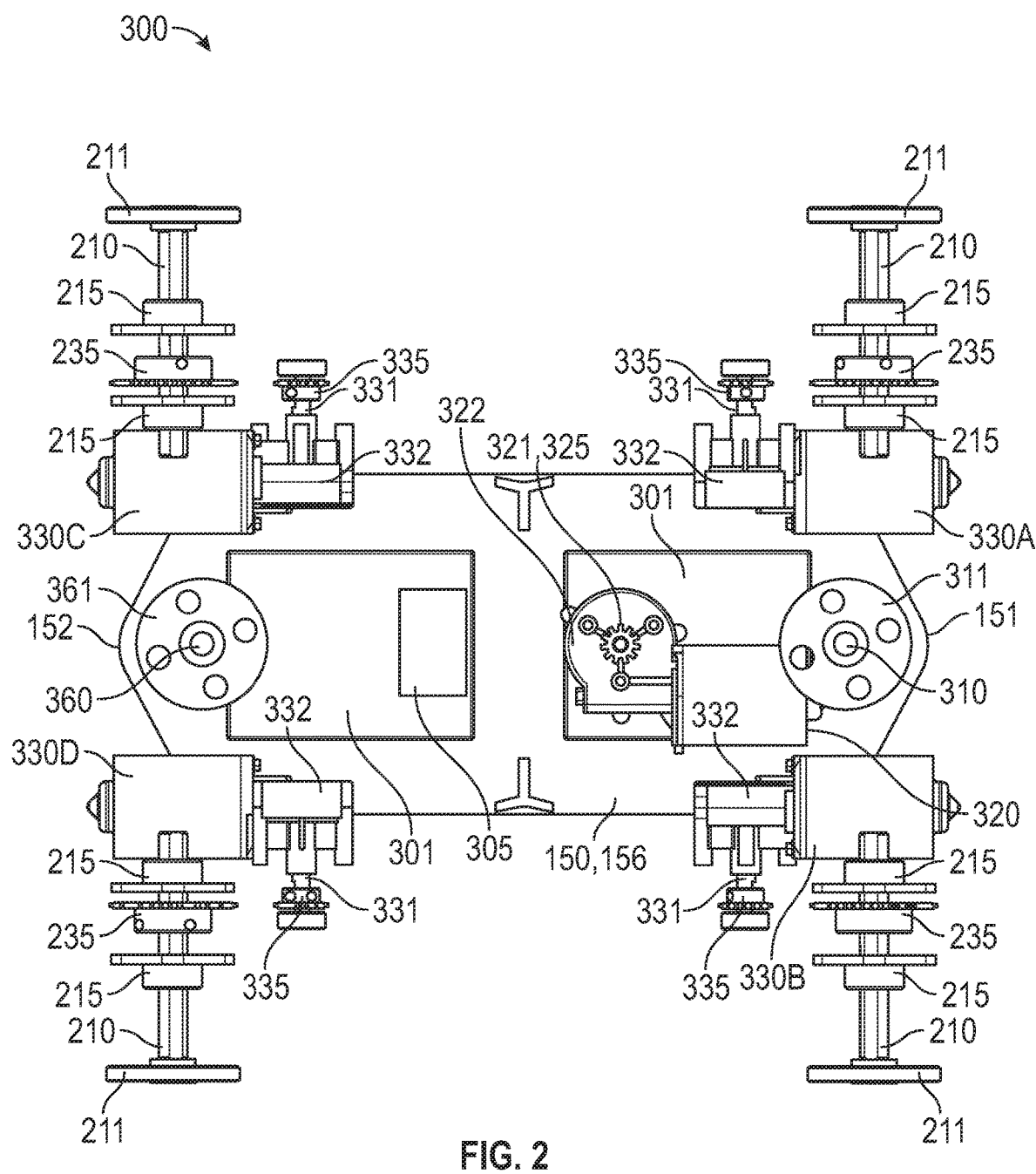
FIG. 2 shows an embodiment of a drive train.

FIG. 2 shows an embodiment of a drivetrain 300 for a mobility device 10. For purposes of illustration, body 100, arms 200, and top plate 157 of base 150 have been removed from mobility device 10 in FIG. 2. Base 150 includes a first end 151 near rear end 102 and a second end 152 near front end 101 with a length extending therebetween. Each arm 200 (shown in FIG. 1) may be rigidly affixed to a rotatable arm shaft 210. In some embodiments, arm shaft 210 may be hollow to permit the routing of wiring therethrough.

Drivetrain 300 includes a battery supply 301 and a control module 305 configured to control and monitor the position of the plurality of arms 200 and body 100. Control module 305 is operable to control the angular positions of the plurality of arms 200, first frame 110, and second frame 160. Control module 305 is logically linked to body motor 320, arm motors 330, and wheel motors 240. Drivetrain 300 includes a first driveshaft 310 and a second driveshaft 360 (best shown in FIG. 3). First driveshaft 310 is mechanically linked to first frame 110 such that rotation of first driveshaft 310 changes the angular position of first frame 110 relative to the length of base 150. The change in angular position of first frame 110 is rotational movement about axis 111 (shown in FIG. 1), which extends through first frame 110. First driveshaft 310 may be rigidly affixed to first frame 110 via a first hub 311. Second driveshaft 360 is mechanically linked to second frame 160 such that rotation of second driveshaft 360 changes the angular position of second frame 160 relative to the length of base 150. The change in angular position of second frame 160 is rotational movement about axis 161 (shown in FIG. 1), which extends through second frame 160. Second driveshaft 360 may be rigidly affixed to second frame 160 via a second hub 361.

Drivetrain 300 includes a plurality of arm motors to operate the plurality of arms 200. The plurality of arm motors may include a first arm motor 330A operable to drive first arm 200A, a second arm motor 330B operable to drive second arm 200B, a third arm motor 330C operable to drive third arm 200C, and a fourth arm motor 330D operable to drive fourth arm 200D (collectively and individually referred to as arm motor 330). The number of arm motors 330 may be equal to the number of arms 200. It may be advantageous to utilize a plurality of arm motors 330 to independently drive the plurality of arms 200 and increase adaptability to terrain. First arm motor 330A and second arm motor 330B may be mounted upon first frame 110. Third arm motor 330C and fourth arm motor 330D may be mounted upon second frame 160.

In some embodiments, an arm 200 may be keyed directly to an output shaft 331 of the respective arm motor 330. In some embodiments, arm motor 330 may include a gear reducer 332 before output shaft 331 to increase the torque output. In some embodiments, arm motor 330 may transfer torque to a corresponding arm shaft 210 via a portal gear. In some embodiments, a worm gear motor may be used for these and other motors described herein as would be appreciated by one skilled in the art having the benefit of this disclosure.

Figure 3:
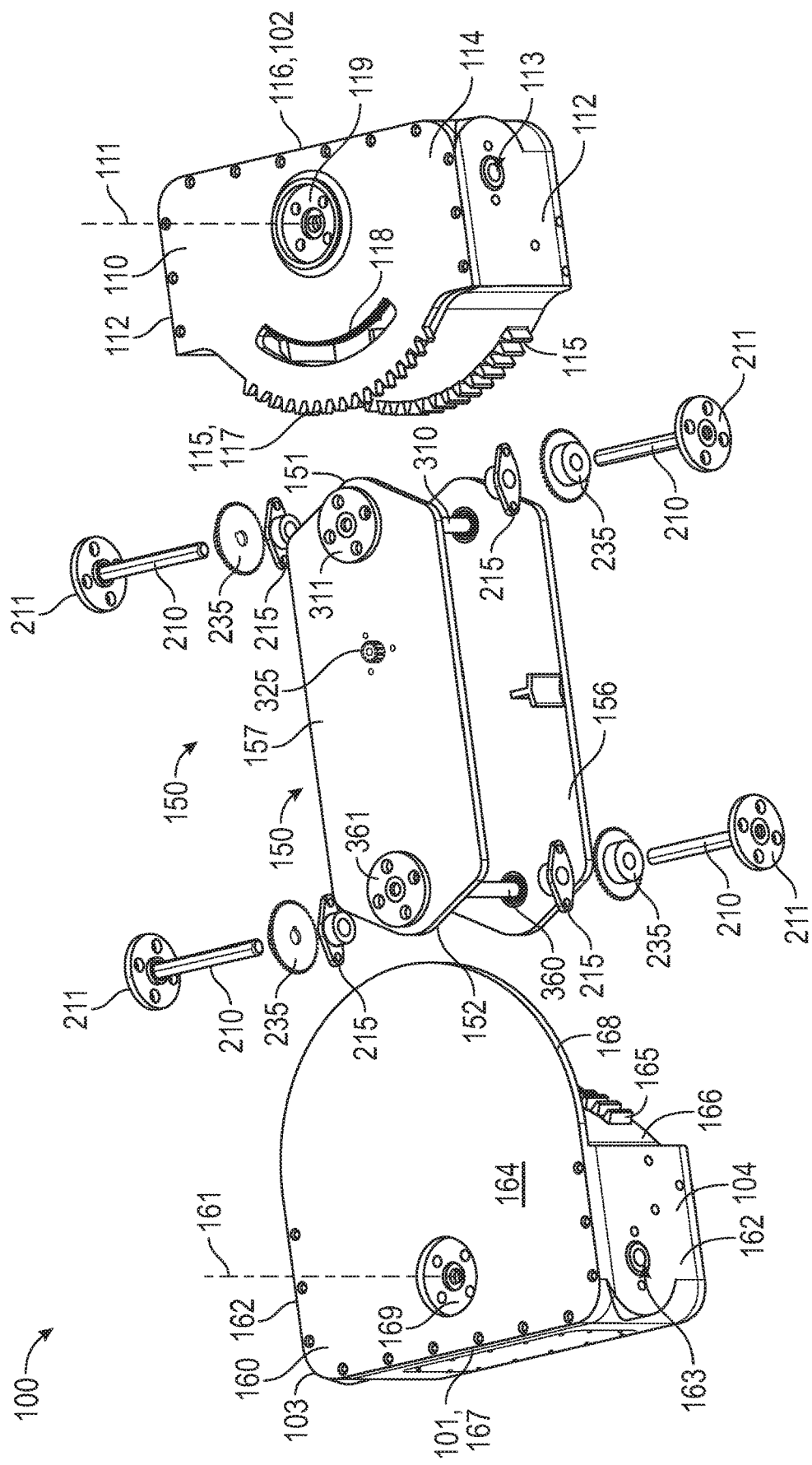
FIG. 3 shows a partially exploded view of an embodiment of a body and portions of a drivetrain of a mobility device.

Output shaft 331 may be connected to a motor sprocket 335 and each of the plurality of arms 200 may include an arm sprocket 235. Motor sprocket 335 is mechanically linked to arm sprocket 235. For example, motor sprocket 335 may be connected to arm sprocket 235 via a chain or belt (not shown). Rotation of arm sprocket 235 induces rotation of the arm 200 about its respective arm axis 206 (shown in FIG. 1). An embodiment of a connection between arm sprocket 235 and arm 200 is shown in FIGS. 2 and 3. Arm sprocket 235 is keyed to arm shaft 210, which is rotatably supported upon bearings 215. Arm shaft 210 may be rigidly affixed to an arm 200 via an arm hub 211.

Referring again to FIG. 2, drivetrain 300 may include a body motor 320 operable to rotationally drive at least one of first driveshaft 310 or second driveshaft 360. Body motor 320 is operated by control module 305, which may receive commands from a passenger, sensors on mobility device 10, and/or from a remote location. In some embodiments, a pair of body motors 320 may be configured to drive first driveshaft 310 and second driveshaft 360. In some embodiments, drivetrain 300 utilizes a transmission to selectively drive the plurality of arms 200 and/or first driveshaft 310 and second driveshaft 360. As shown in FIG. 2, a single body motor 320 may control rotation of first frame 110 and second frame 160. A drive gear 325 is keyed to an output shaft 321 of body motor 320. In some embodiments, body motor 320 may include a gear reducer 322 before output shaft 321 to increase the torque output.

Figure 4:
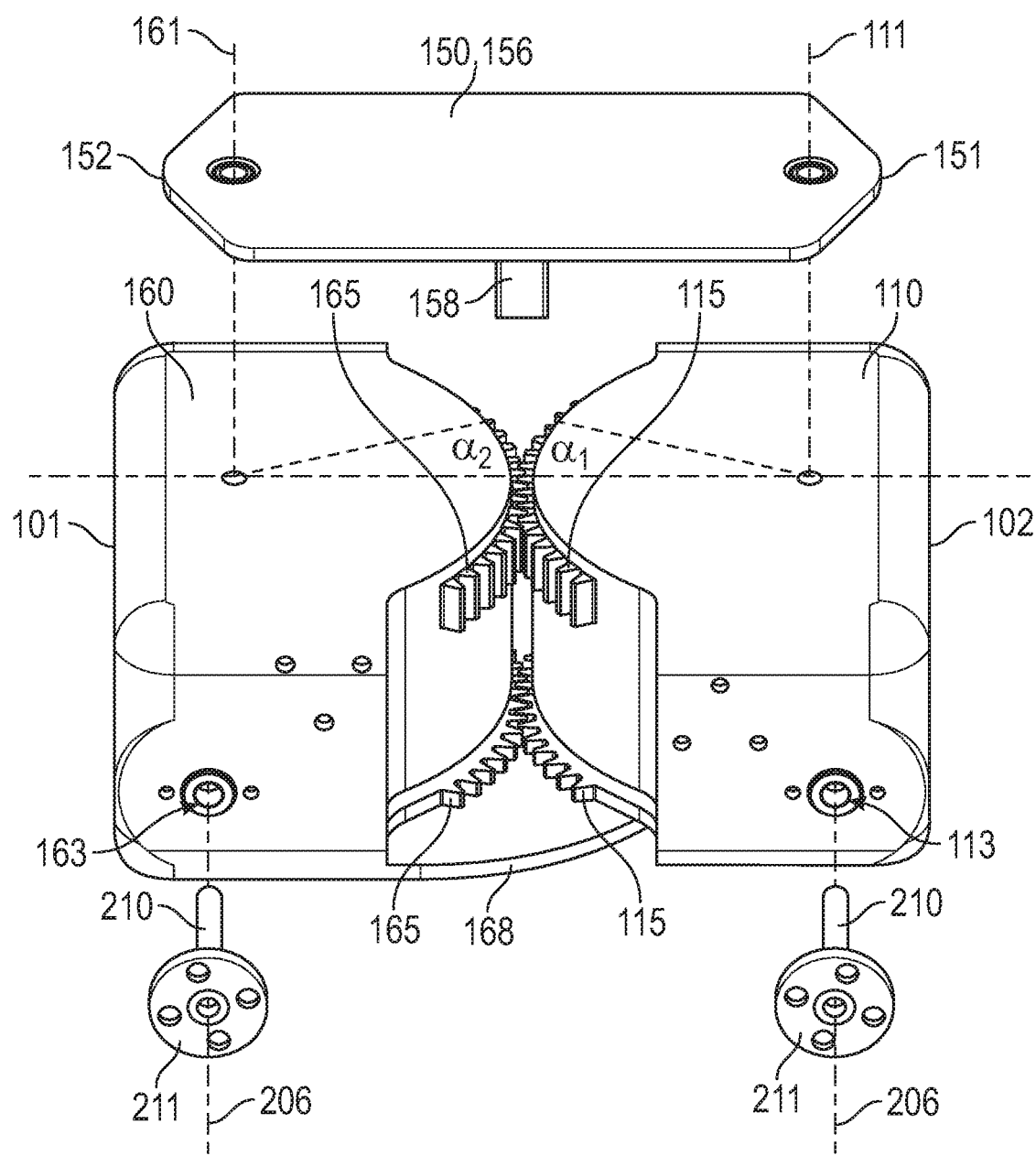
FIG. 4 shows a bottom perspective view of a partially exploded view of the body and portions of a drivetrain of a mobility device.

FIG. 3 shows a partially exploded view of body 100 and portions of drivetrain 300. First frame 110 and second frame 160 have been moved along the length of base 150 for purposes of illustration. FIG. 4 shows another partially exploded view of body 100 from the bottom side and portions of drivetrain 300.

First driveshaft 310 and second driveshaft 360 are rotatably supported upon both bottom plate 156 and top plate 157 of base 150. First frame 110 includes a first end 116 and a second end 117 with a length extending therebetween. The length of first frame 110 is aligned with the length of base 150. First frame 110 may be symmetrical across the length of base 150 and the length of first frame 110. First end 116 forms rear end 102 of body 100. First frame 110 includes lateral sides 112 with openings 113 therein and a top side 114. The lateral sides 112 of first frame 110 and lateral sides 162 of second frame 160 form the first side 103 and second side 104 of body 100. Top side 114 includes an arcuate slot 118 therein and a hub receptacle 119 aligned with axis 111. Arcuate slot 118 may have a radius of curvature about axis 111. Hub receptacle 119 is shaped to receive first hub 311 and lock rotation between first hub 311 and first frame 110 about axis 111.

Arcuate slot 118 may be an arcuate rack and mesh with drive gear 325 to form a rack and pinion. The lateral position of drive gear 325 does not change with respect to base 150 as drive gear 325 rotates. As drive gear 325 is rotated, first frame 110 is rotated about axis 111 via the interaction between drive gear 325 and the arcuate rack. As first frame 110 rotates, arm shafts 210 connected to first frame 110 are carried therewith. The arm shafts 210 for first arm 200A and second arm 200B (shown in FIG. 1) form a first pair of arm shafts rotatably supported on opposing sides 112 of first frame 110 within openings 113.

First frame 110 may include a first gear profile 115 at second end 117. First gear profile 115 may have a radius of curvature about axis 111. As shown in FIG. 3, first gear profile 115 may include a plurality of vertically spaced sets of gear teeth along the top and bottom sides of first frame 110.

Second frame 160 includes a first end 166 and a second end 167 with a length extending therebetween. The length of second frame 160 is aligned with the length of base 150. Second frame 160 may be symmetrical across the length of base 150 and the length of second frame 160. Second end 167 forms front end 101 of body 100. Second frame 160 includes lateral sides 162 with openings 163 therein and a top side 164. Top side 164 includes a hub receptacle 169 aligned with axis 161. Hub receptacle 169 is shaped to receive second hub 361 and lock rotation between second hub 361 and second frame 160 about axis 161. As second frame 160 rotates, arm shafts 210 connected to second frame 160 are carried therewith. The arm shafts 210 for third arm 200C and fourth arm 200D (shown in FIG. 1) form a second pair of arm shafts rotatably supported on opposing sides 162 of second frame 160 within openings 163.

Second frame 160 may include a second gear profile 165 at first end 166. Second gear profile 165 has a radius of curvature about axis 161. As best shown in FIG. 4, second gear profile 165 may include a plurality of vertically spaced sets of gear teeth along the top and bottom sides of second frame 160. Top side 164 may include a cover portion 168 that extends over first frame 110. Cover portion 168 covers second gear profile 165 and may include a hemispherical profile. The hemispherical profile may prevent second frame 160 from ending beyond outer sidewall 255 of wheels 250 (shown in FIG. 1) when body 100 is fully articulated. Cover portion 168 may cover the entirety of arcuate slot 118 on first frame 110. Cover portion 168 may also provide a surface for mounting a seat 50 (shown in FIG. 6).

Referring to both FIG. 3 and FIG. 4, arm shafts 210 extend along their respective axes 206 and through openings 113 in the lateral sides 112 of first frame 110. Additional arm shafts 210 extend along their respective axes 206 and through openings 163 in the lateral sides 162 of second frame 160. Rotation of arm shafts 210 within openings 163 rotate their respective arm hubs 211 with respect to body 100. However, the rotation of arm shafts 210 may not change the orientation of first frame 110 with respect to second frame 160.

As shown in FIG. 4, first gear profile 115 and second gear profile 165 are shaped to mesh with each other. FIG. 4 is shown from the bottom side to show the multiple sets of meshing gear profiles. First gear profile 115 and second gear profile 165 may have the same radius of curvature. Cover portion 168 rotates as part of second frame 160 and extends over second gear profile 165 to impede access to the intermeshing first gear profile 115 and second gear profile 165 from the top side. Base 150 may include a guard 158 positioned to impede access to the intermeshing first gear profile 115 and second gear profile 165 from the side. For example, guard 158 may protrude upward from bottom plate 156 of base 150. In some embodiments, guard 158 may include a limiter switch to prevent over-rotation of first frame 110 and second frame 160.

The distance between axis 111 and axis 161 is fixed along the length of base 150. The center of gravity of mobility device 10 may be positioned along the length of base 150 between axis 111 and axis 161. For purposes of demonstration, a clockwise rotation (measured from the top side) is defined as positive rotation and counterclockwise rotation is defined as negative rotation. Angular deflection $\alpha_1$ of first frame 110 and angular deflection $\alpha_2$ of second frame 160 are referenced in relation to the length of base 150 and are shown with no deflection in FIG. 4. As first frame 110 moves in a positive direction, second frame 160 moves in a negative direction via the interaction between first gear profile 115 and second gear profile 165, and vice versa. When first gear profile 115 and second gear profile 165 have the same radius of curvature, the magnitudes of the deflections are equal as they rotate simultaneously.

Figure 5:
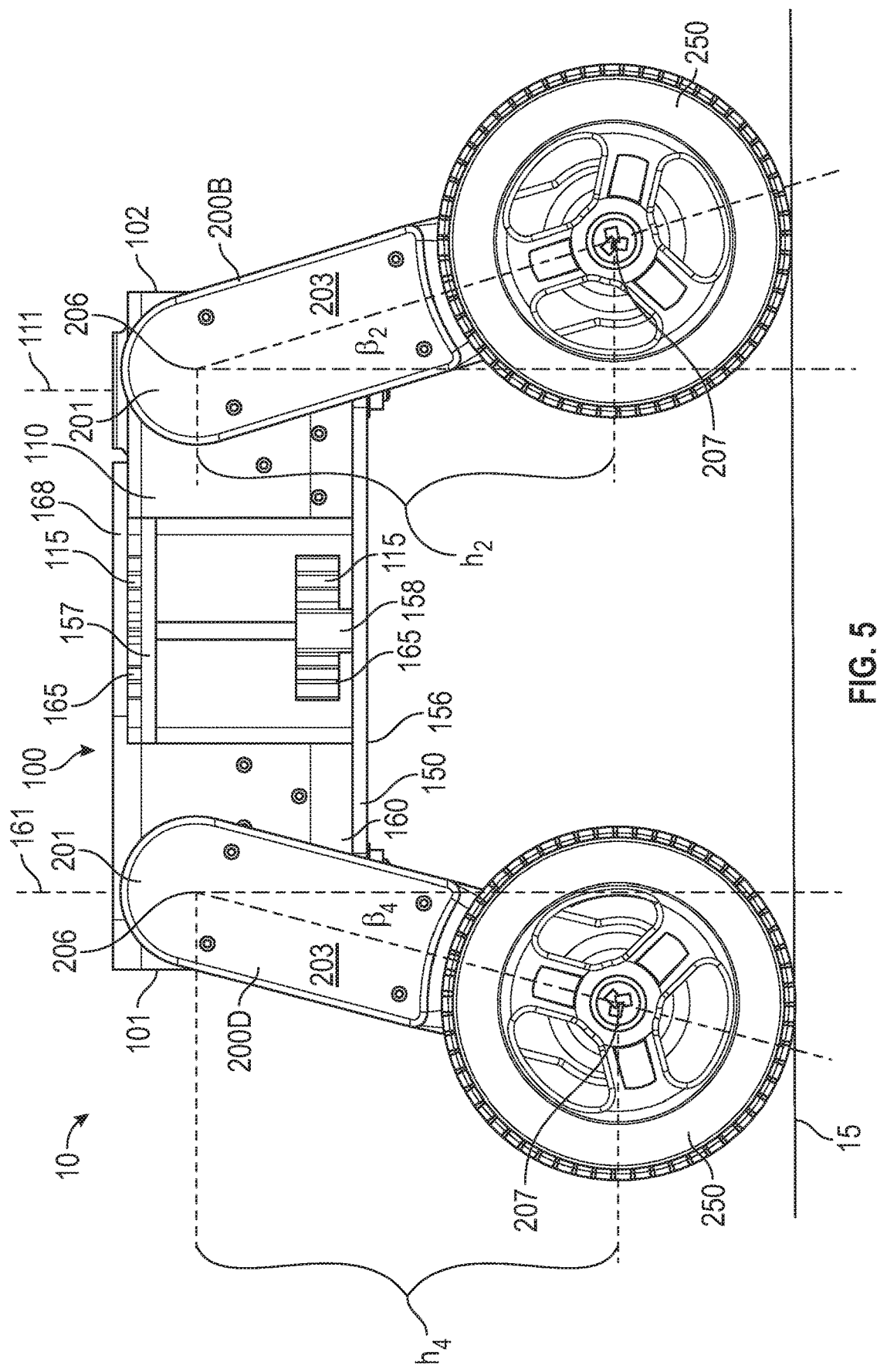
FIG. 5 shows a side view of an embodiment of a mobility device.

FIG. 5 is a side view of mobility device 10. As discussed above, body 100 includes a first frame 110 rotatable about a first axis 111 and a second frame 160 rotatable about a second axis 161. Arm axis 206 of the arms 200 connected to first frame 110 intersect with first axis 111 and arm axis 206 of the arms 200 connected to second frame 160 intersect with second axis 161. Rear end 102 of body 100 is located on first frame 110 and front end 101 of body 100 is located on second frame 160. Rotational motion of first frame 110 or second frame 160 is transferred to the other via intermeshing first and second gear profiles 115, 165. A guard 158 impedes access to the intermeshing first gear profile 115 and second gear profile 165. First frame 110 and second frame 160 are supported upon bottom plate 156 and top plate 157 of base 150. A top set of teeth of first gear profile 115 and second gear profile 165 may be positioned between top plate 157 and cover portion 168 of second frame 160. However, the rotation of first frame 110 and second frame 160 does not change the orientation of arms 200 with respect to first frame 110 and second frame 160 to which the arms 200 are attached. First arm 200A and second arm 200B are rotatably disposed on first frame 110. Third arm 200C and fourth arm 200D are rotatably disposed on second frame 160. Each arm 200 is rotatably supported upon body 100 at first end 201 of arm 200 and is rotatable in relation to body 100 about its respective arm axis 206. Each arm 200 is connected at its second end 202 to its respective wheel 250 or wheels 250, which rotates about axis 207. Arm axis 206 may be parallel to axis 207.

Angular deflection $\beta_2$ of second arm 200B, the height $h_2$ of second arm 200B, angular deflection $\beta_4$ of fourth arm 200D, and the height $h_4$ of fourth arm 200D are shown in FIG. 5 to illustrate the movement of these arms. However, the discussion is applicable to angular deflection $\beta_1$ and height $h_1$ of first arm 200A and angular deflection $\beta_3$ and height $h_3$ of third arm 200C as would be appreciated by one skilled in the art having the benefit of this disclosure (collectively and individually referred to as angular deflection $\beta$ and height h). Likewise, the discussion is applicable to embodiments that include more than four arms as well. For purposes of illustration, rotation of an arm 200 beneath bottom plate 156 that moves wheels 250 away from the midsection of mobility device 10, where the meshing first gear profile 115 and second gear profile 165 are located, is defined as positive rotation and rotation towards the midsection of mobility device 10 is defined as negative rotation. As shown in FIG. 5, all arms 200 have a positive angular deflection β.

The angular deflection β of an arm 200 is measured from the vertical (measured in the direction of gravity when wheels 250 of mobility device 10 are supported upon a flat surface 15). The angular deflection β of arm 200 changes the height h between arm axis 206 about which arm 200 rotates and axis 207 about which wheel 250 connected to arm 200 rotates. The angular deflection β of arms 200 may be modified independent from one another. Arms 200 of mobility device 10 may be independently operated to maneuver across uneven surfaces, such as stairs or rocks, and/or to provide stability for movement.

Figure 6:
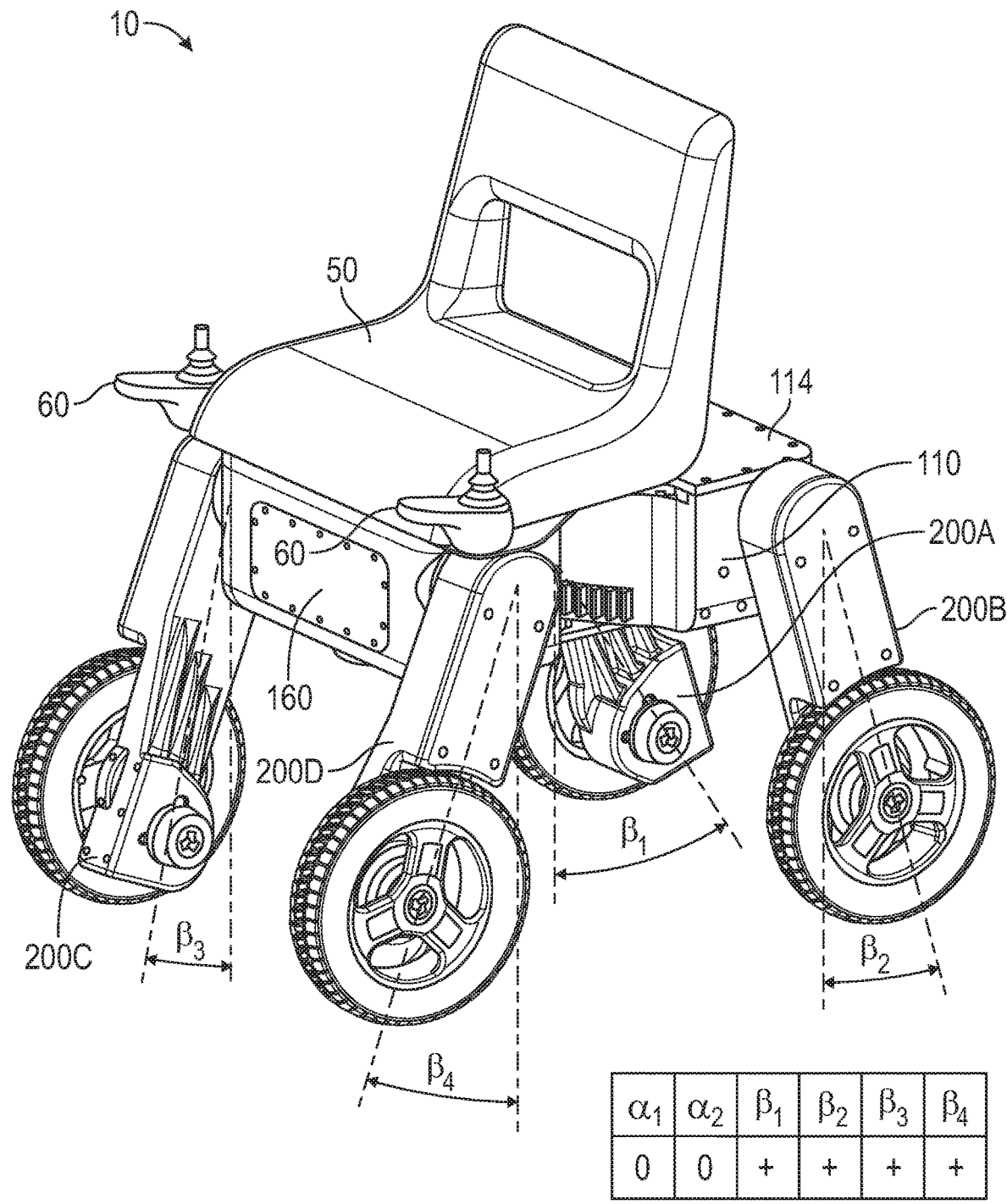
FIG. 6 shows an embodiment of a mobility device with a seat and direct controls mounted thereupon.

Mobility device 10 is operable to modify angular deflection β of arms 200 as well as angular deflection $\alpha_1$ of first frame 110 and angular deflection $\alpha_2$ of second frame 160 in order to adapt to various circumstances and terrain. Various positions of mobility device 10 are illustrated in FIGS. 6-14. In some embodiments, a user may operate mobility device 10 through direct controls 60, such as a set of joysticks as shown in FIG. 6. A seat 50 may be mounted above first frame 110 and second frame 160. Seat 50 may be mounted above cover portion 168 (shown in FIG. 3) of second frame 160.

In FIG. 6, mobility device 10 is shown in a mid-position: angular deflection $\alpha_1$ of first frame 110 and angular deflection $\alpha_2$ of second frame 160 are both zero and angular deflection of arms 200 are all positive. Top side 114 of mobility device 10 may be raised by reducing the magnitude of angular deflection β of arms 200. Likewise, top side 114 of mobility device 10 may be lowered by increasing the magnitude of angular deflection β of arms 200. As angular deflection β of all of arms 200 is increased positively, mobility device 10 is stretched and lowered. In the stretched position, mobility device 10 may have increased stability when traveling at relatively higher speeds.

Figure 7:
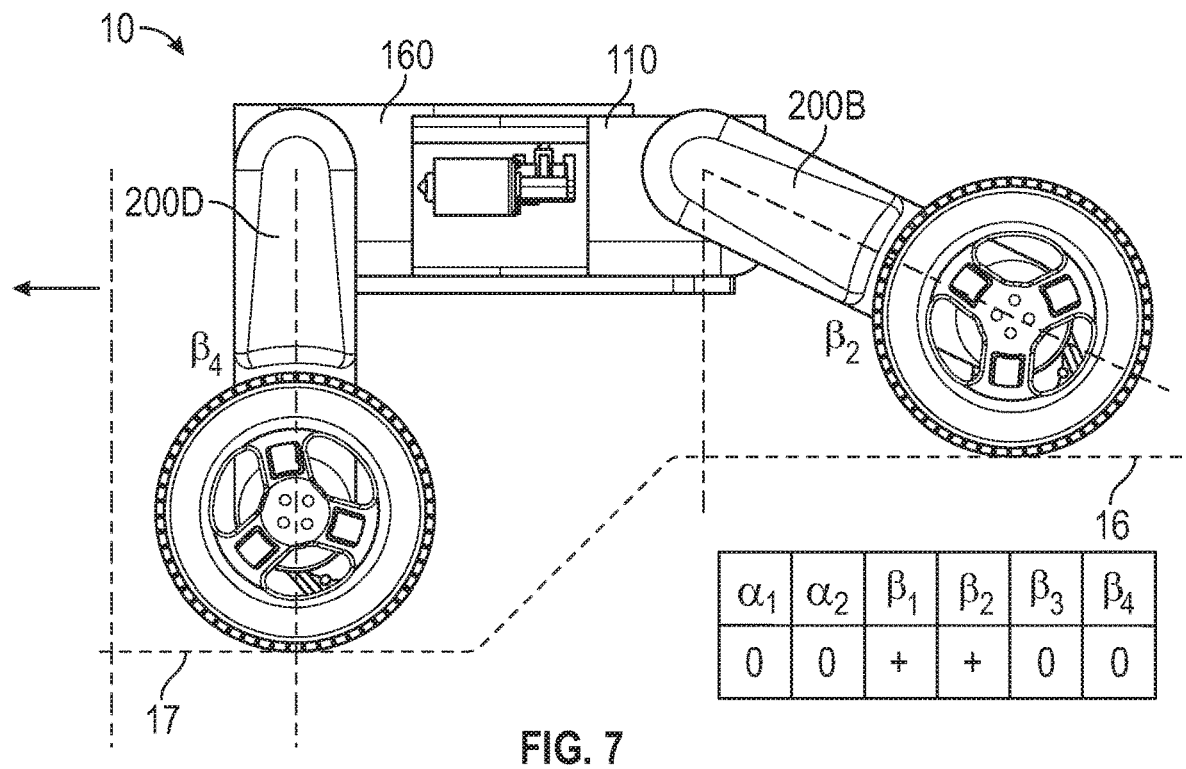
FIG. 7 shows the mobility device transitioning from a raised surface to a lower surface.

FIG. 7 shows mobility device 10 transitioning from a raised surface 16 to a lower surface 17. As mobility device 10 approaches the end of the raised surface 16, it may be in a stretched position with a positive angular deflection β of arms 200. As the third and fourth arms 200C, 200D begin to lower to the lower surface 17, the angular deflections $\beta_3$, $\beta_4$ of the third and fourth arms 200C, 200D is reduced such that that first frame 110 and second frame 160 remain relatively level as mobility device 10 transitions to the lower surface 17. Likewise, the angular deflections $\beta_1$, $\beta_2$ of the first and second arms 200A, 200B may be modified as they transition to the lower surface 17.

Figure 8:
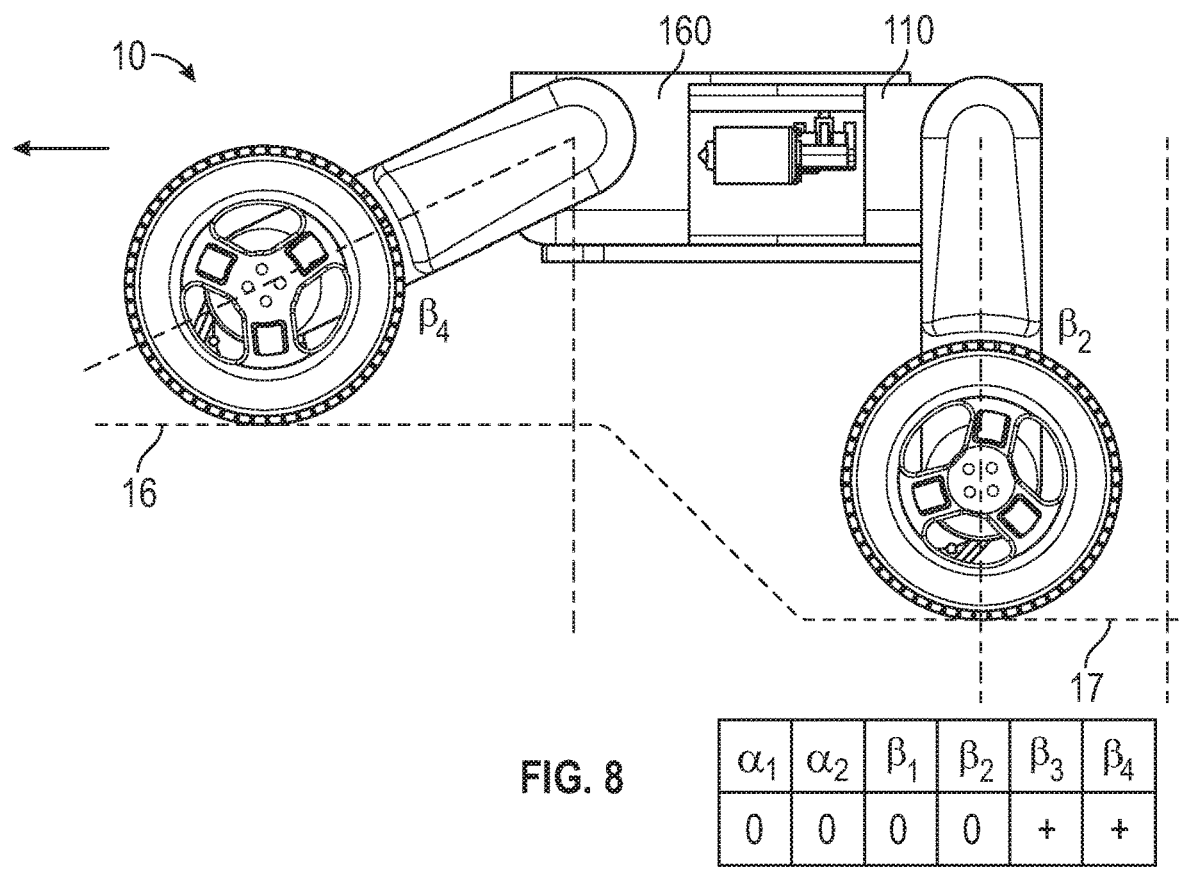
FIG. 8 shows the mobility device transitioning from a lower surface to a raised surface.

FIG. 8 shows mobility device 10 transitioning from a lower surface 17 to a raised surface 16. As mobility device 10 approaches the end of the lower surface 17, it may be in a stretch position with a positive angular deflection β of arms 200. As the third and fourth arms 200C, 200D begin to raise to the raised surface 16, the angular deflections $\beta_1$, $\beta_2$ of the first and second arms 200A, 200B is reduced such that that first frame 110 and second frame 160 remain relatively level as mobility device 10 transitions to the raised surface 16. Likewise, the angular deflections $\beta_3$, $\beta_4$ of the third and fourth arms 200C, 200D may be modified as the first and second arms 200A, 200B transition to the raised surface 16.

Figure 9:
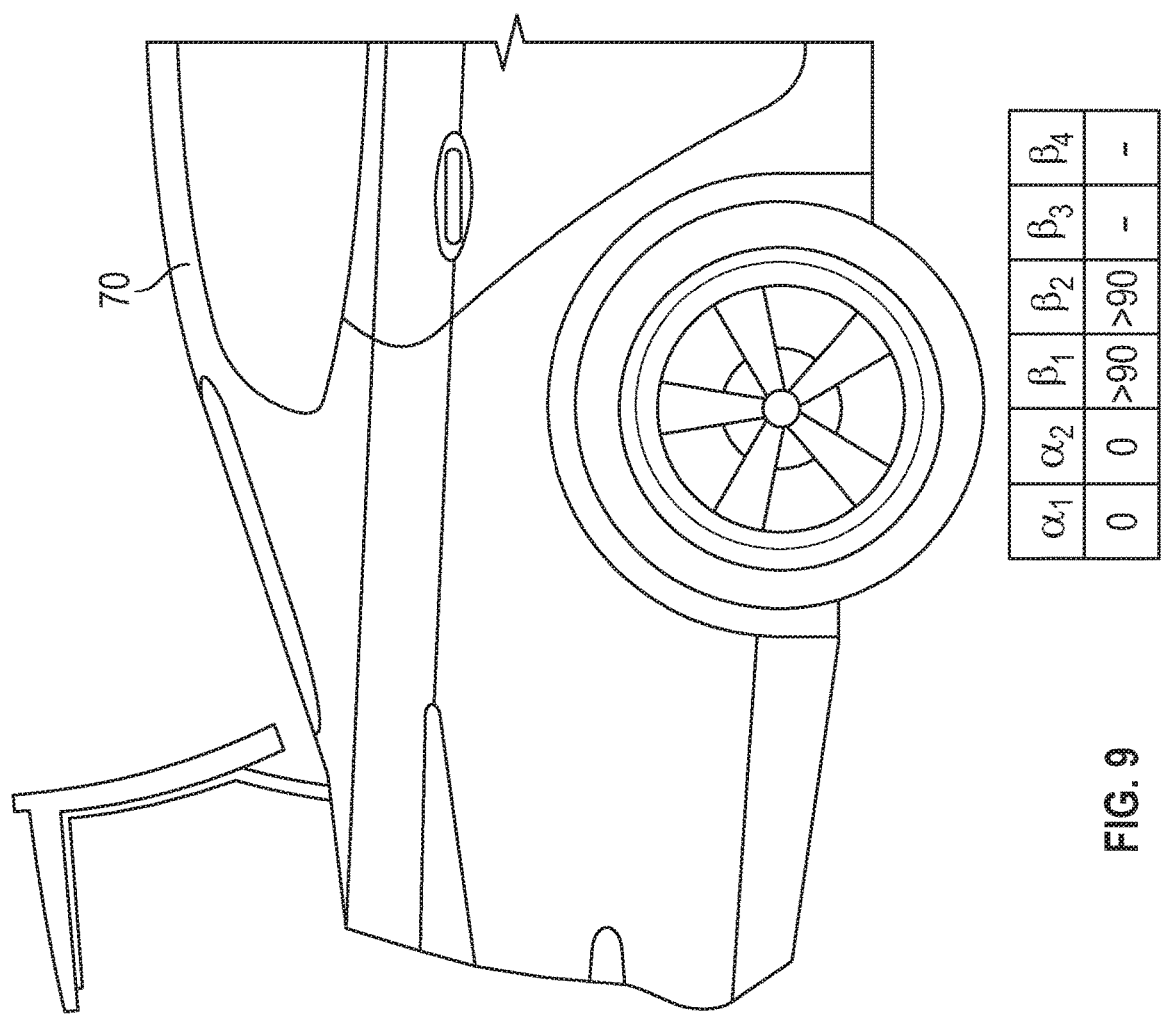
FIG. 9 shows the mobility device positioned in a balanced position upon two wheels.
Figure 9:
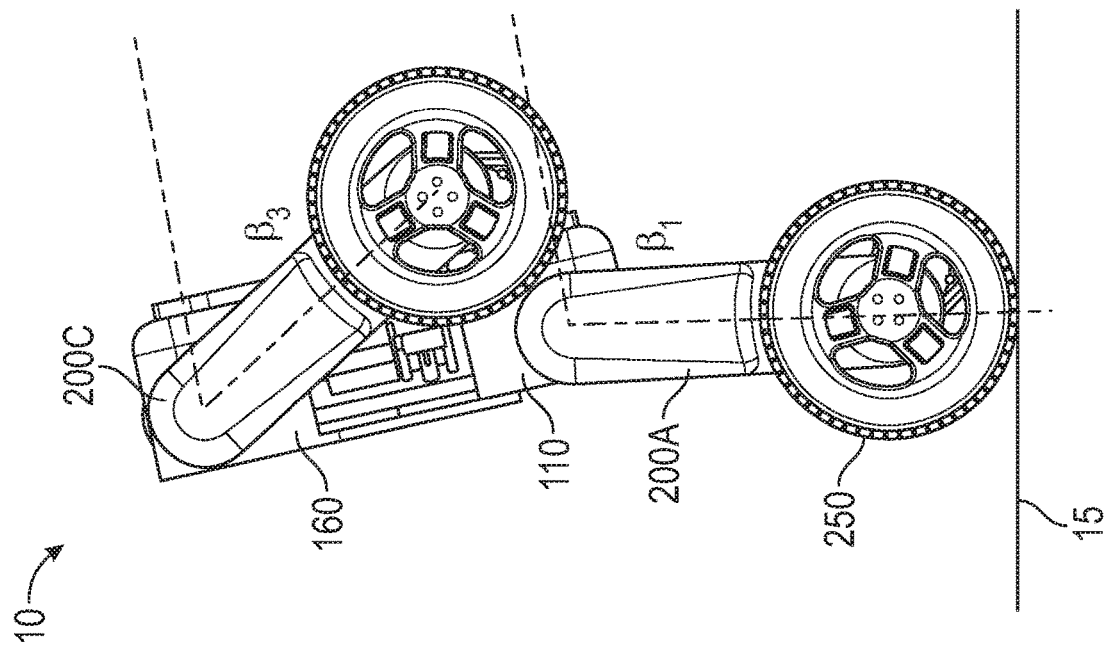

FIG. 9 shows mobility device 10 positioned in a balanced position upon two wheels 250. In this position, the forward arms 200C, 200D of mobility device 10 may be extended to access a larger height difference, such as a ledge, while transporting cargo or to store itself in the back seat or trunk of a vehicle 70.

Figure 10:
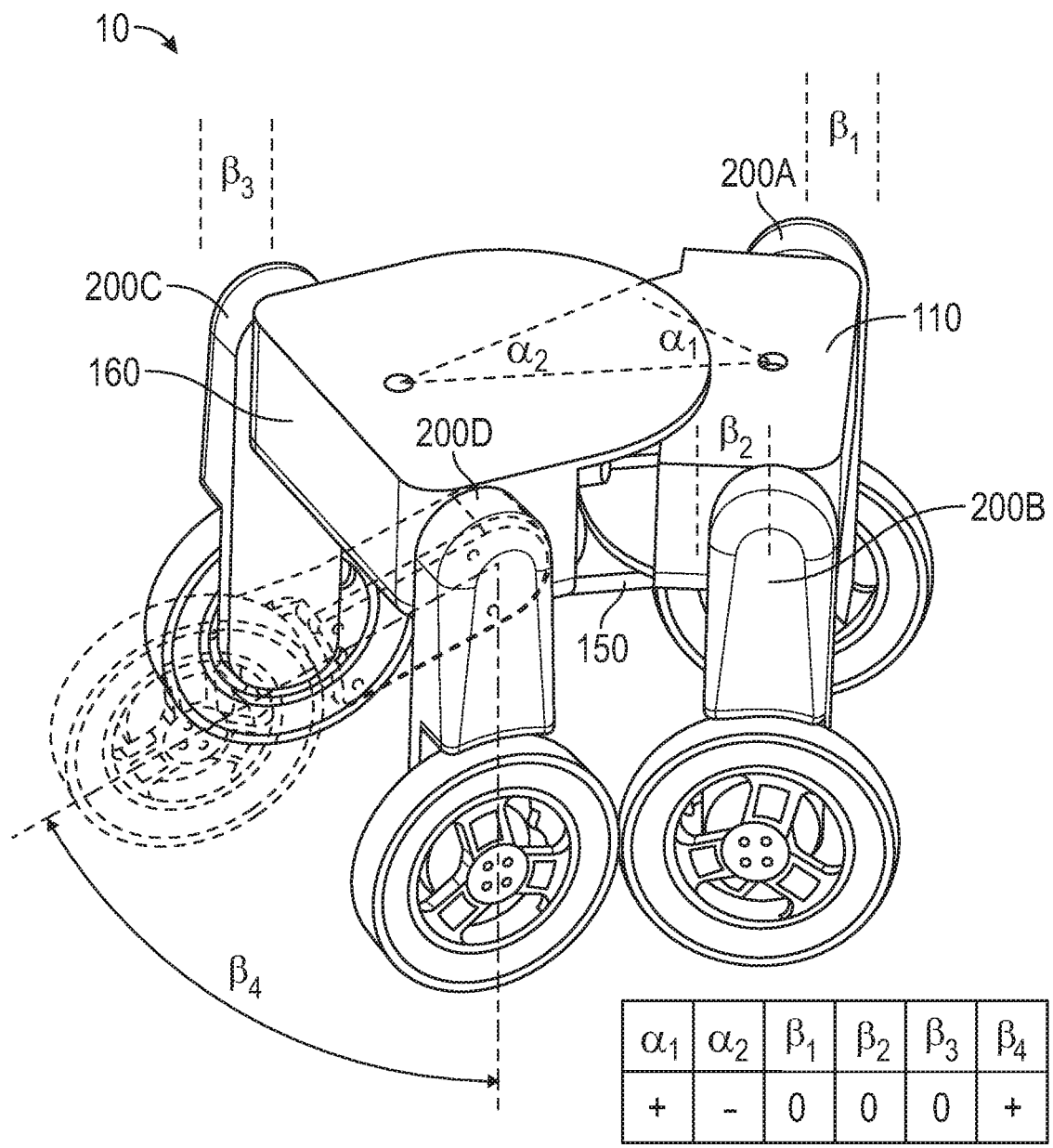
FIG. 10 shows the mobility device in an articulated position.

FIG. 10 shows mobility device 10 in an articulated position. The position of base 150 does not change. Angular deflection $\alpha_1$ of first frame 110 is positive and angular deflection $\alpha_2$ of second frame 160 is negative, which causes mobility device 10 to turn to the left. While supported upon the first, second, and third arms 200A. 200B, 200C, the fourth arm 200D may be raised from a first position to a second position (shown in dashed lines) to reach a raised surface, such as a step. With fourth arm 200D positioned upon the raised surface, mobility device 10 may articulate in the opposite direction (e.g. to the right) and third arm 200C may be raised to reach the raised surface. In this manner, mobility device 10 may position itself upon a step. Repeated articulation and raising of an arm 200 may be continued to navigate multiple steps.

Figure 11:
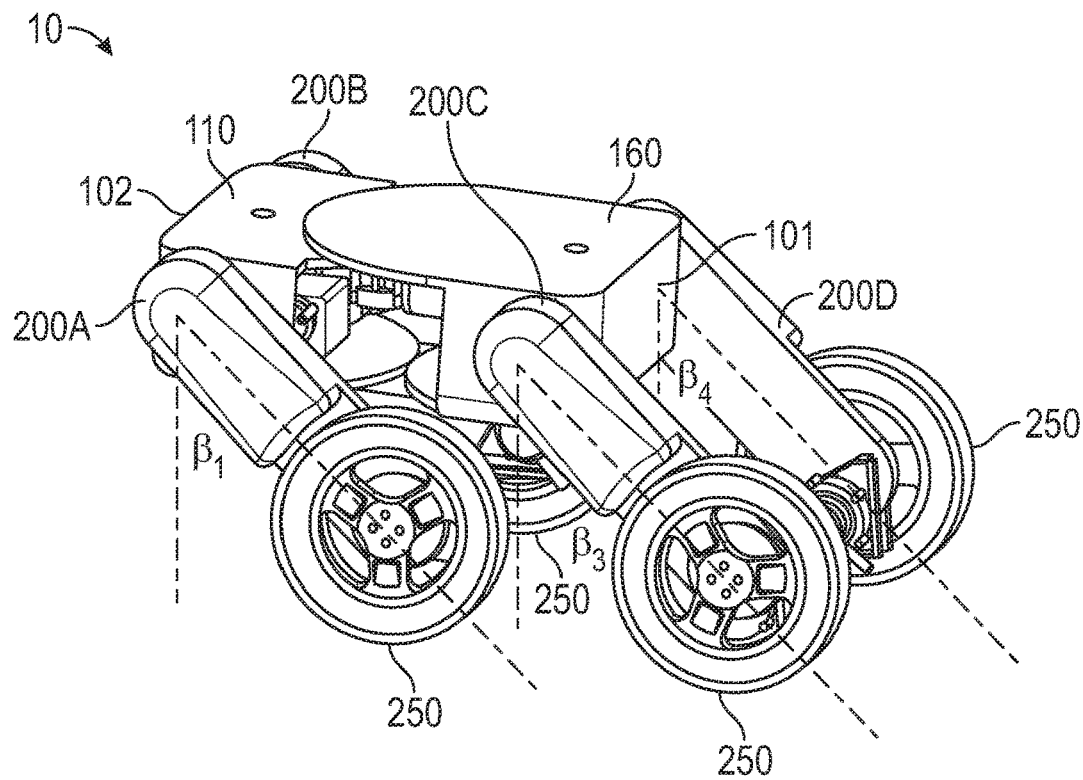
FIG. 11 shows the mobility device positioned in a lowered, rearward position.

FIG. 11 shows mobility device 10 positioned in a lowered, rearward position. In this position, the rear end 102 of mobility device 10 may be unobstructed so as to avoid being a tripping hazard for those moving behind mobility device 10. As shown, the angular deflections $\beta_1$, $\beta_2$ of the first and second arms 200A, 200B may be negative and the angular deflections $\beta_3$, $\beta_4$ of the third and fourth arms 200C, 200D may be positive. In another position, the position of arms 200 may be reversed so that the front end 101 of mobility device 10 may be unobstructed. For instance, a user may be lowered into a seated position at a table without the wheels 250 interfering with a support structure underneath the table.

Figure 12:
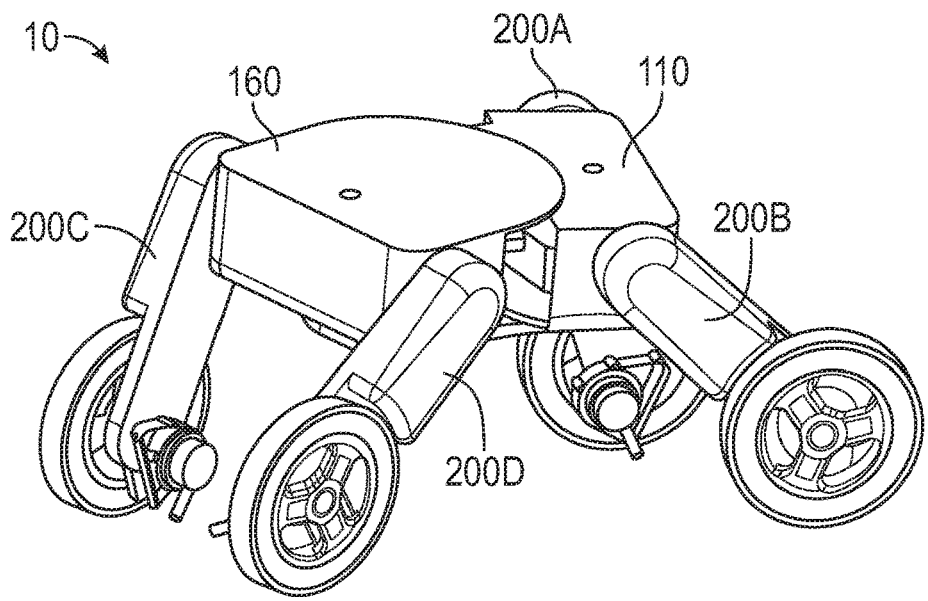
FIG. 12 shows the mobility device positioned in a turning, banked position.
Figure 13:
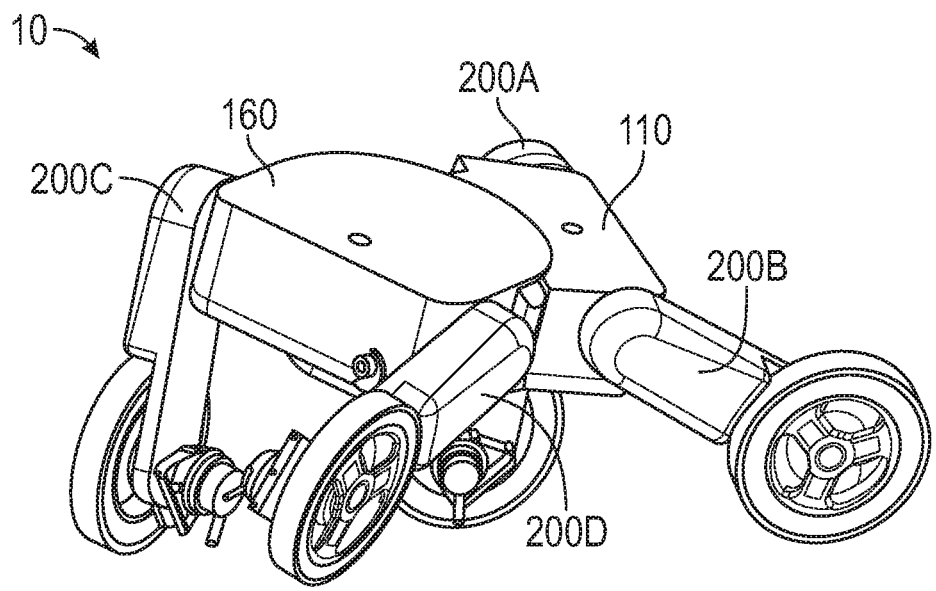
FIG. 13 shows the mobility device positioned in a turning, banked position with a greater banking angle than in FIG. 12.

To turn mobility device 10, first frame 110 and second frame 160 may be articulated by modifying angular deflection $\alpha_1$ of first frame 110 and angular deflection $\alpha_2$ of second frame 160. At low speeds, mobility device 10 may be turned without angular deflection of arms 200. As the speed of mobility device 10 increases, the magnitude of angular deflection β of arms 200 may be increased in order to lower the center of gravity for improved stability and/or lean forward. During a turning maneuver, one side of mobility device 10 may be lowered to form a banking position to further increase stability and/or increase comfort for a user operating mobility device 10. Control module 305 may automatically lower one side of mobility device 10 when first frame 110 and second frame 160 are articulated. For instance, as shown in FIG. 12, mobility device 10 is articulated to the left and angular deflection of second arm 200B and fourth arm 200D is greater than angular deflection of the first arm 200A and third arm 200C. When banking on a flat surface it may be desirable for the angular deflection of first arm 200A to be equal to the angular deflection of third arm 200C and for the angular deflection of second arm 200B to be equal to the angular deflection of fourth arm 200D. As shown in FIG. 13, the angular deflection of second arm 200B and fourth arm 200D may be increased even further as the speed of mobility device 10 is increased.

Figure 14:
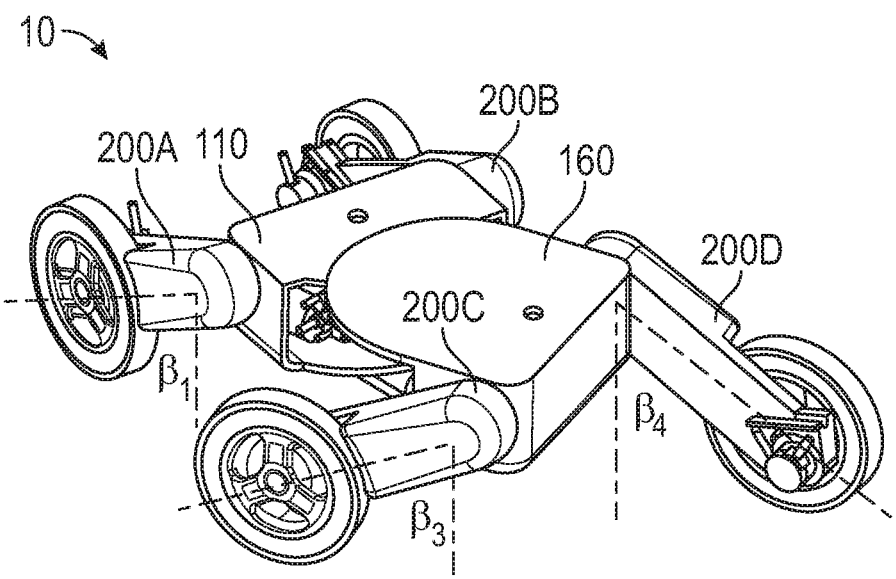
FIG. 14 shows the mobility device positioned in a lowered, loading position.

Independent movement of the arms may also be useful to assist a user with transferring on and off mobility device 10. As shown in FIG. 14, first frame 110 and second frame 160 are articulated to the left. First arm 200A, second arm 200B, and fourth arm 200D each have a positive angular deflection, $\beta_1$, $\beta_2$, $\beta_4$. Third arm 200C has a negative angular deflection $\beta_3$. The rearward position of third arm 200 creates an opening for a user to access, while also facilitating an overall lowered height of first frame 110 and second frame 160.

Figure 15:
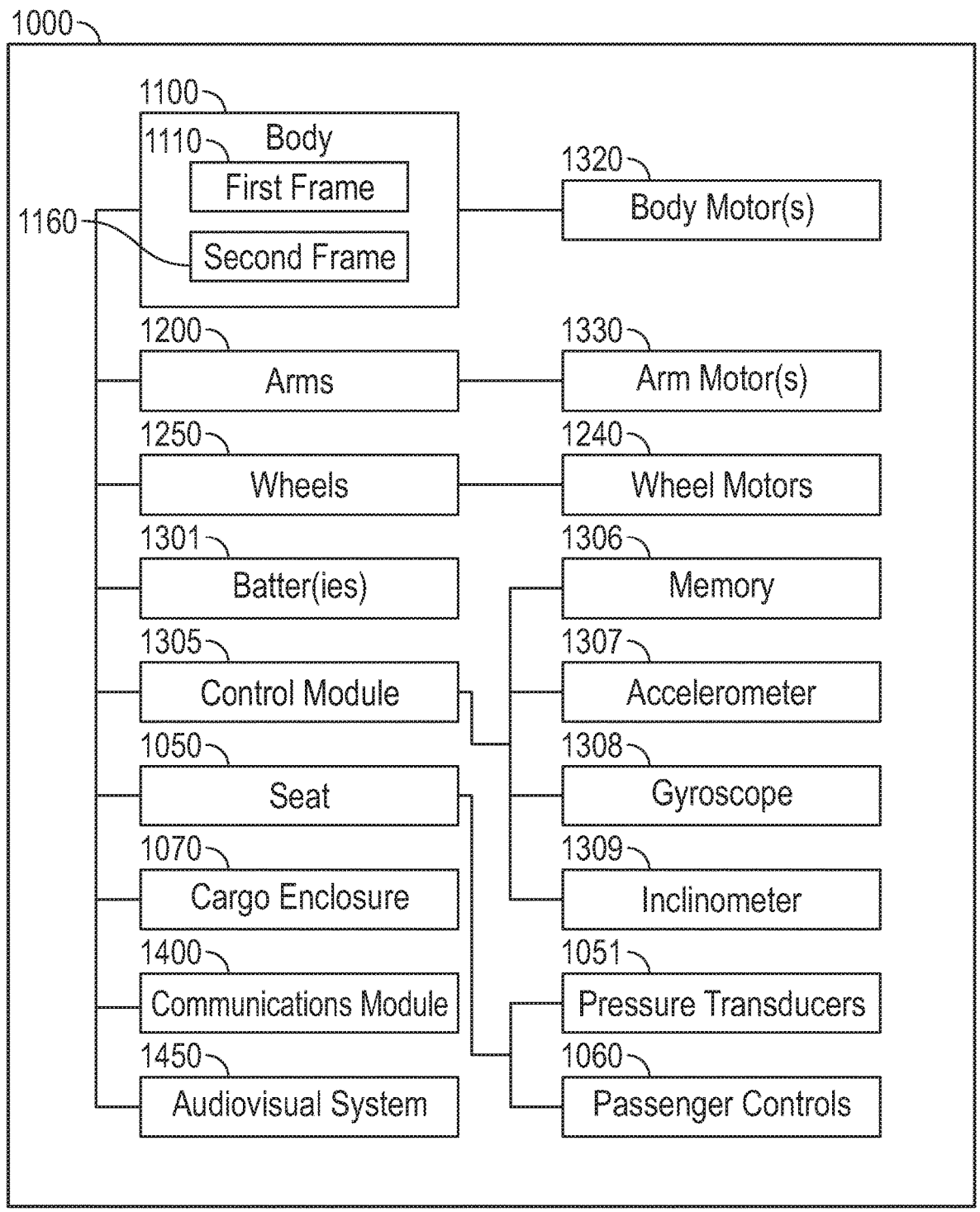
FIG. 15 is a schematic diagram of an embodiment of a mobility device.

FIG. 15 is a schematic diagram of a mobility device 1000. Mobility device 1000 includes a body 1100, a plurality of arms 1200, and a plurality of wheels 1250 with at least one wheel 1250 supported upon each of the plurality of arms 1200. Body 1100 includes a first frame 1110 and a second frame 1160. First frame 1110 forms a rear portion of mobility device 1000 and second frame 1160 forms a front portion of mobility device 1000. First frame 1110 is articulatable about a first axis and second frame 1160 is articulatable about a second axis. First frame 1110 and second frame 1160 may be rotatably linked. When one of first frame 1110 or second frame 1160 is rotational about their respective axis the other is also rotational about its respective axis in the opposite direction. First frame 1110 and second frame 1160 may be rotatably linked such that the rate of rotation of first frame 1110 is equal to the rate of rotation of second frame 1160 except in the opposite direction. Mobility device 1000 includes at least one body motor 1320 operable to articulate first frame 1110 and second frame 1160 about their respective axes. In some embodiments, first frame 1110 and second frame 1160 may each include their own body motor 1320 operable to articulate first frame 1110 and second frame 1160 about their respective axes. In some embodiments, first frame 1110 and second frame 1160 are mechanically linked such that a single body motor 1320 is used and rotation of either first frame 1110 or second frame 1160 causes the other to rotate in the opposite direction.

The plurality of arms 1200 are selectively driven by at least one arm motor 1330. The at least one arm motor 1330 may be a plurality of arm motors 1330. In some embodiments, each arm motor 1330 may manipulate the angular displacement of more than one arm 1200. In some embodiments, each arm motor 1330 may manipulate the angular displacement of only one arm 1200. It may be advantageous to utilize the same number of arm motors 1330 as the number of arms 1200 in order to reduce the complexity of a drivetrain needed to split the torque from an arm motor 1330 to multiple arms 1200. Wheels 1250 of each arm 1200 are driven by a wheel motor 1240.

Mobility device 1000 includes a battery supply 1301 and a control module 1305 operable to control and monitor the position of the plurality of arms 1200 and body 1100. The control module 1305 is logically linked to the body motors 1320, arm motors 1330, and wheel motors 1240 in order to modify their operation. The control module 1305 may access a memory module 1306 to store the position of body 1100 and arms 1200. In addition, known functions and training modules may be stored in memory module 1306. For instance, in some embodiments, mobility device 1000 may be "taught" how to access raised surfaces positions, such as the back seat or trunk of a vehicle, to store itself. The sequence of movements may be stored as a function within memory module 1306 and may be activated when it is desired to perform the function. For example, a user may "train" the mobility device to navigate loading itself into the trunk of a vehicle. This training may be uploaded to a database, such as an online server. A user of another mobility device may download the function to their own mobility device to train the device to load itself into the trunk. Likewise, memory module 1306 may store a function corresponding to ascending or descending a stairway in a home. These illustrated functions are intended to be exemplary.

In some embodiments, mobility device 1000 may be used to transport a passenger. Mobility device 1000 may include a seat 1050 and passenger controls 1060, such as joysticks for controlling movement of mobility device 1000. In some embodiments, mobility device 1000 is self-leveling. The mobility device may include one or more, such as a plurality of, accelerometers 1307, gyroscopes 1308 and inclinometers 1309 to provide feedback to control module 1305. In some embodiments, a passenger may lean while seated upon mobility device 1000 to control the movement and the direction of travel. Seat 1050 may be equipped with a plurality of pressure transducers 1051 to determine the position of the user. The measurements of the pressure transducers 1051 are relayed to control module 1305, which implements the desired movement based upon the measurements. In some embodiments, both passenger controls 1060 and pressure transducers 1051 may be used to direct movement of mobility device 1000. For example, passenger controls 1060 may be used to control forward and rearward movement of mobility device 1000 while leaning is used to control the articulation of body 1100 and thus, turning movements of mobility device 1000.

In some embodiments, mobility device 1000 may be used to transport cargo, such as camping supplies, and may be suitable for more extreme maneuvers without concern for a passenger's position. A cargo enclosure 1070 may be mounted upon the top side of body 1100. Mobility device 1000 may be useful as a utility robot. Mobility device 1000 may be used autonomously.

In some embodiments, mobility device 1000 may be remotely operable. Mobility device 1000 may include a communications module 1400 operable to receive commands from a remote location and relay those commands to control module 1305 of the mobility device 1000. For instance, first responders may control mobility device 1000 to bring supplies to another location. Mobility device 1000 may be used to patrol an area, such as a college or business campus. Mobility device 1000 may be used to make deliveries. In some embodiments, a location of a transponder may be sent to communications module 1400 and control module 1305 may operate mobility device 1000 to following the location of the transponder. For instance, a passenger or gear may be loaded upon mobility device 1000 and a transponder may be held by a user walking in front of mobility device 1000. Control module 1305 may operate mobility device 1000 to follow the user holding the transponder so that it is followed along the same path. Similarly, the transponder may form part of a communications module 1400 of a mobility device 1000 and two mobility devices may form a caravan guided by the first mobility device.

Mobility device 1000 may be equipped with an audiovisual system 1450 such as a display and/or speaker for presenting audio and/or video from a remote location. Likewise, audiovisual system 1450 may include sensors such as cameras and a microphone to relay audio and/or video to a remote location. The camera may be used to guide mobility device 1000 remotely or autonomously. The cameras may be equipped with infrared sensors to increase operability in low-light conditions. For example, mobility device 1000 may carry a package from a delivery vehicle to a recipient's doorstep. A message may be shown upon the display of audiovisual system 1450 that requests a signature from the recipient that can be entered on the display. Once a signature has been received, mobility device 1000 may release the package to the recipient and return to the delivery vehicle. Mobility device 1000 may then execute a stored function in order to store itself upon the delivery vehicle.

In some embodiments, the audiovisual system 1450 may support video conferencing, to allow others in a remote location to communicate with the user of mobility device 1000. For instance, video conferencing may be used to connect family members with each other. If needed, the family members may be able to assume control of mobility device 1000 in order to check on the status of a family member in a remote location. Likewise, first responders may be able to utilize video conferencing to assess the condition of a person in a remote location, such as within a collapsed structure. In some embodiments, mobility device 1000 may include voice control or interactive features to simulate a personal companion, such as a pet, rather than merely a tool, such as a motorized wheelchair.

Figure 16:
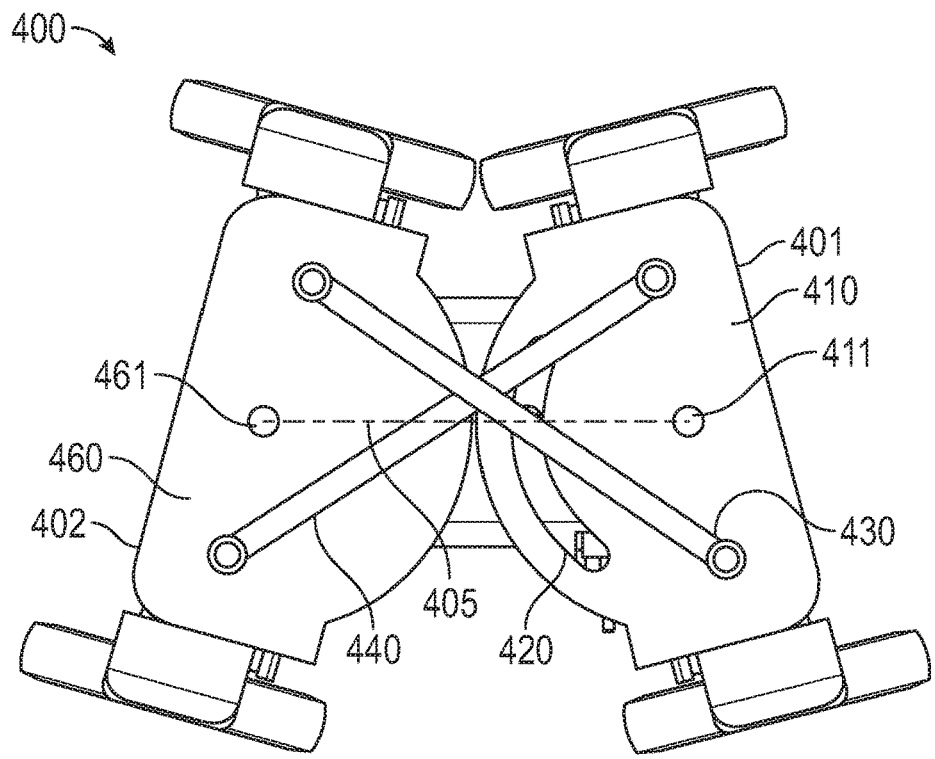
FIG. 16 shows an embodiment of a mobility device with a linkage assembly articulated to the left.
Figure 17:
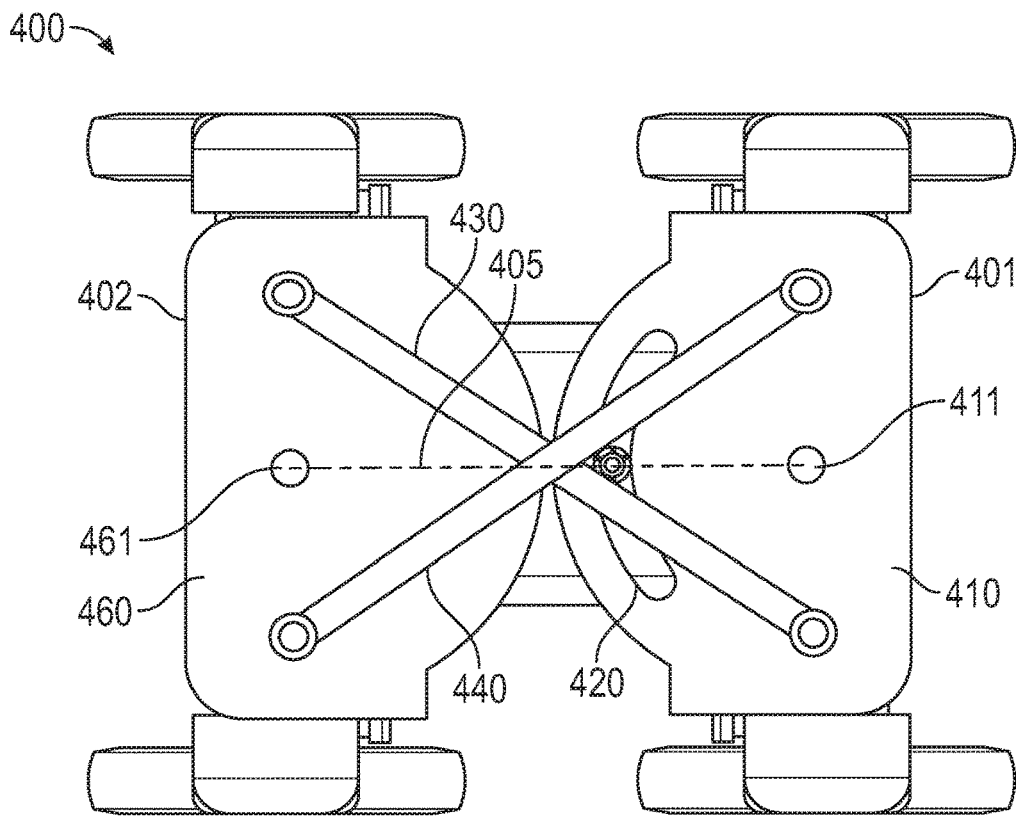
FIG. 17 shows an embodiment of a mobility device with a linkage assembly in a neutral position.
Figure 18:
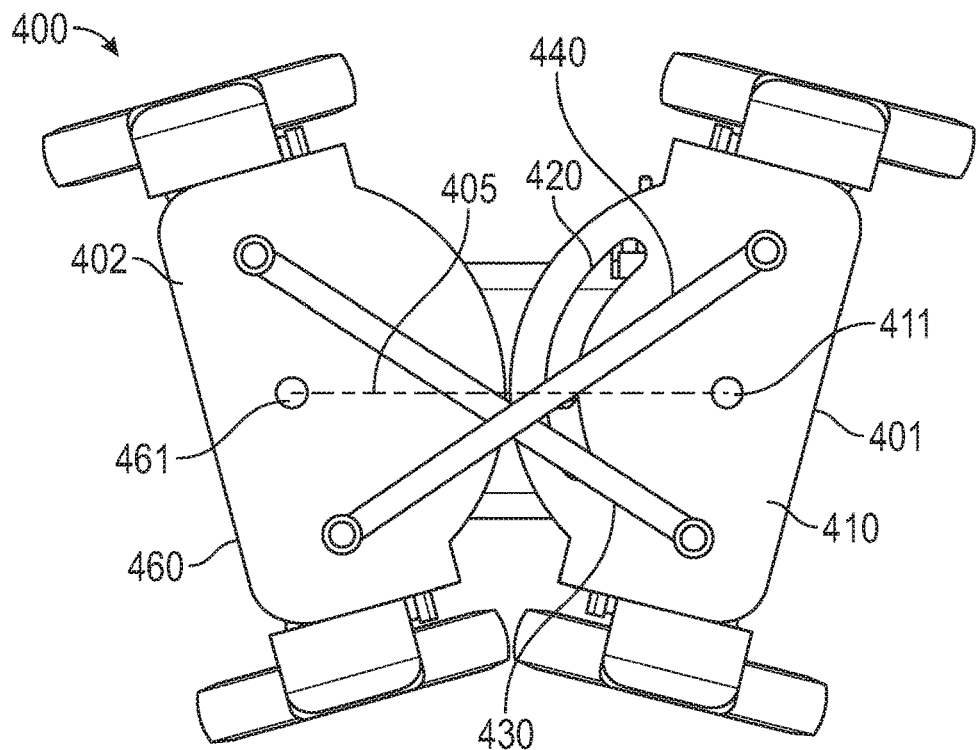
FIG. 18 shows an embodiment of a mobility device with a linkage assembly articulated to the right.

FIGS. 16-18 show an embodiment of a mobility device 400 with a body comprised of a first end 401, a second end 402, a first frame 410 and a second frame 460. FIG. 16 shows mobility device 400 articulated to the left. FIG. 17 shows mobility device 400 in a neutral position. FIG. 18 shows mobility device 400 articulated to the right. First frame 410 is rotatable about a first axis 411. First frame 410 may include an arcuate slot 420 to guide and track rotation of first frame 410 about first axis 411. Second frame 460 is rotatable about a second axis 461. A length 405 extends between first axis 411 and second axis 461. Mobility device 400 includes a linkage assembly formed of a first linkage 430 extending crosswise from first frame 410 to second frame 460. A used herein, extending crosswise indicates that the connection points for the first frame 410 and the second frame 460 are on opposing sides of the length 405 extending between first axis 411 and second axis 461. The linkage assembly of mobility device 400 may include a second linkage 440 extending crosswise from first frame 410 to second frame 460 such that first frame 410 and second frame 460 each include two linkage connection points on opposing sides of length 405. During articulation of first frame 410, one of first linkage 430 and second linkage 440 is placed in tension and the other is placed in compression to articulate second frame 460 in the opposite direction. In some embodiments, only one of first linkage 430 and second linkage 440 is used.

Figure 19:
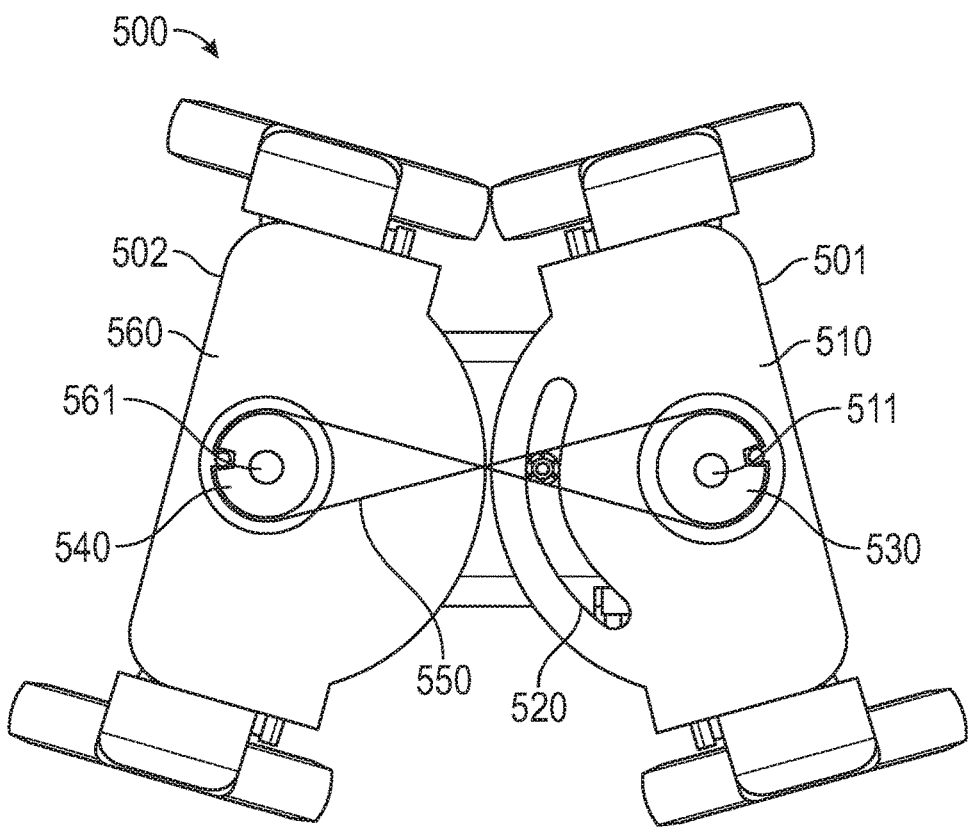
FIG. 19 shows an embodiment of a mobility device with a cable assembly articulated to the left.
Figure 20:
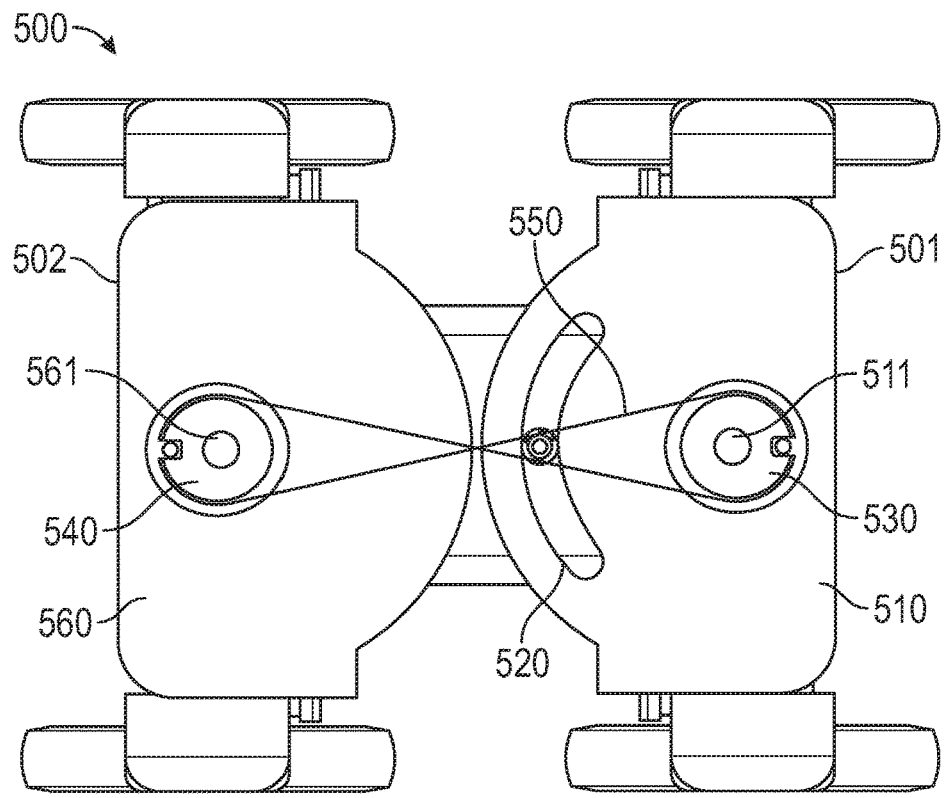
FIG. 20 shows an embodiment of a mobility device with a cable assembly in a neutral position.
Figure 21:
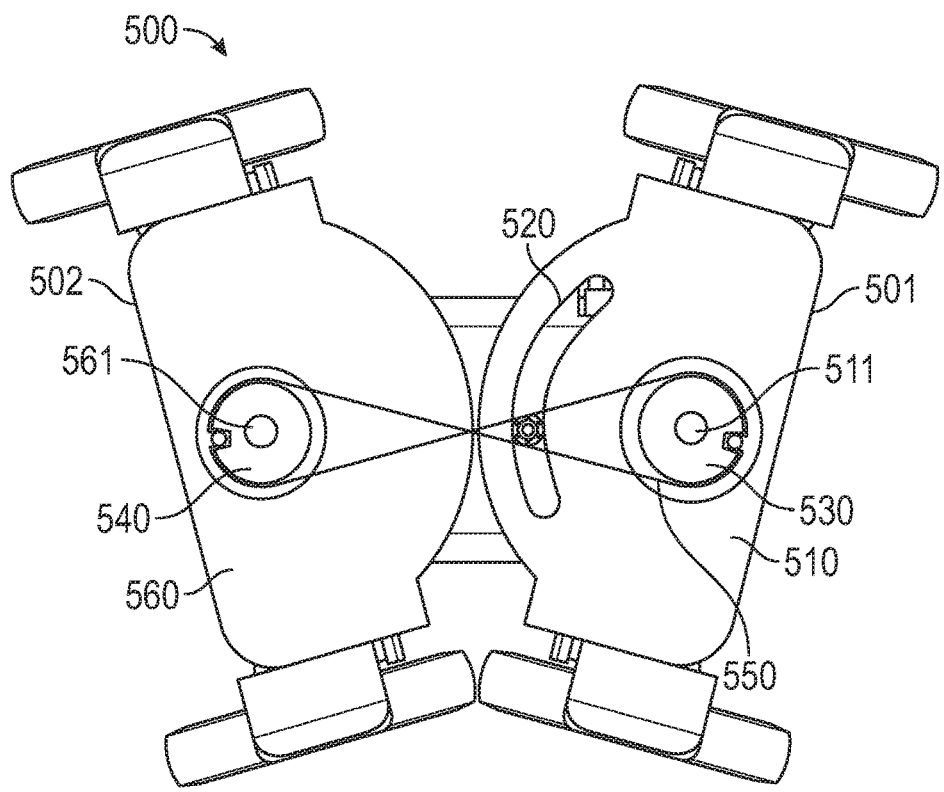
FIG. 21 shows an embodiment of a mobility device with a cable assembly articulated to the right.

FIGS. 19-21 show an embodiment of a mobility device 500 with a body comprised of a first end 501, a second end 502, a first frame 510 and a second frame 560. FIG. 19 shows mobility device 500 articulated to the left. FIG. 20 shows mobility device 500 in a neutral position. FIG. 21 shows mobility device 500 articulated to the right. First frame 510 is rotatable about a first axis 511. First frame 510 may include an arcuate slot 520 to guide and track rotation of first frame 510 about first axis 511. Second frame 560 is rotatable about a second axis 561. Mobility device 500 includes a cable assembly formed of a first pulley 530 or cam on first frame 510, a second pulley 540 or cam on second frame 560, and a cable 550. Cable 550 is formed in a FIG. 8 configuration and fixed to first pulley 530 and second pulley 540. When first frame 510 is rotatable clockwise about first axis 511, cable 550 is carried clockwise with first pulley 530 and counterclockwise with second pulley 540, which causes second frame 560 to rotate about second axis 561, and vice versa.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A mobility device comprising:
    a body having a front end, a rear end, a first frame, a second frame, and a length extending from the front end to the rear end, the rear end is located on the first frame, the front end is located on the second frame, the first frame is rotatable about a first axis extending through the first frame, the second frame is rotatable about a second axis extending through the second frame;
    a body motor operable to rotationally drive the first frame and the second frame;
    a plurality of arms rotatably supported on the body, each arm having a first end and a second end, each arm rotatable with respect to the body about a respective arm axis;
    at least one arm motor operable to independently rotate the plurality of arms about their respective arm axis;
    a plurality of wheels supported upon the second ends of the plurality of arms; and
    a plurality of wheel motors, each wheel motor operable to drive a respective one of the plurality of wheels.

2. The mobility device of claim 1, wherein the first frame and the second frame are rotatably linked such that rotation of the first frame causes rotation of the second frame in an opposite direction.

3. The mobility device of claim 2, wherein the plurality of arms includes at least four arms, two of the four arms supported upon the first frame, the other two of the four arms supported upon the second frame.

4. The mobility device of claim 3, wherein the plurality of arms is exactly four arms.

5. The mobility device of claim 3, wherein the first axis is perpendicular to the length of the body.

6. The mobility device of claim 5, wherein the arm axis of each of the plurality of arms supported upon the first frame is perpendicular to the first axis.

7. The mobility device of claim 3, wherein the at least one arm motor is a plurality of arm motors, each arm motor operable to rotate a respective one of the plurality of arms about the arm axis at the first end of the arm.

8. The mobility device of claim 2, wherein the first frame includes a first gear profile, the second frame includes a second gear profile meshed with the first gear profile, wherein rotational motion of either the first frame or the second frame induces rotational motion of the other of the first frame and the second frame, wherein the first gear profile has a first radius of curvature about the first axis and the second gear profile has a second radius of curvature about the second axis.

9. The mobility device of claim 8, wherein the first radius of curvature is equal to the second radius of curvature.

10. A mobility device comprising:
    a base having a first end, a second end, and a length extending from the first end to the second end;
    a first frame affixed to a first driveshaft, the first driveshaft rotatably supported upon the base along a first axis closer to the first end than the second end of the base;
    a second frame affixed to a second driveshaft, the second driveshaft rotatably supported upon the base along a second axis closer to the second end than the first end of the base;
    a body motor operable to rotationally drive the first frame and the second frame;
    a first pair of arm shafts rotatably supported on opposing sides of the first frame;
    a second pair of arm shafts rotatably supported on opposing sides of the second frame;
    a plurality of arms including a first arm rotationally linked to a first arm shaft of the first pair of arm shafts, a second arm rotationally linked to a second arm shaft of the first pair of arm shafts, a third arm rotationally linked to a third arm shaft of the second pair of arm shafts, and a fourth arm rotationally linked to a fourth arm shaft of the second pair of arm shafts;
    a plurality of arm motors including a first arm motor mechanically linked to the first arm shaft, a second arm motor mechanically linked to the second arm shaft, a third arm motor mechanically linked to the third arm shaft, and a fourth arm motor mechanically linked to the fourth arm shaft;

a plurality of wheels including a first wheel rotatably supported upon the first arm, a second wheel rotatably supported upon the second arm, a third wheel rotatably supported upon the third arm, and a fourth wheel rotatably supported upon the fourth arm;

a plurality of wheel motors operable to drive the plurality of wheels, the plurality of wheel motors including a first wheel motor mechanically linked to the first wheel, a second wheel motor mechanically linked to the second wheel, a third wheel motor mechanically linked to the third wheel, and a fourth wheel motor mechanically linked to the fourth wheel; and a control module logically linked to the body motor, the plurality of arm motors, and the plurality of wheel motors.

11. The mobility device of claim 10, wherein the first axis is parallel to the second axis.

12. The mobility device of claim 11, wherein the body motor includes a drive gear and the first frame includes an arcuate rack meshed with the drive gear, the arcuate rack having a radius of curvature about the first axis, wherein rotation of the drive gear induces rotation of the first frame with respect to the base.

13. The mobility device of claim 12, wherein the first frame includes a first gear profile, the second frame includes a second gear profile meshed with the first gear profile, wherein the first gear profile has a first radius of curvature about the first axis and the second gear profile has a second radius of curvature about the second axis, the first radius of curvature being equal to the second radius of curvature.

14. The mobility device of claim 11, wherein the second frame includes a cover portion extending over the first frame.

15. The mobility device of claim 14, further comprising:
a seat mounted on the cover portion; and
a set of direct controls in communication with the control module.

16. The mobility device of claim 14, further comprising:
a seat mounted on the cover portion; and
one or more pressure transducers beneath the seat in communication with the control module, the control module being configured to modify operation of at least one of the body motor, the plurality of arm motors, and the plurality of wheel motors based upon measurements of the one or more pressure transducers.

17. The mobility device of claim 11, further comprising a memory module including a stored function, the stored function including a sequence of movements of the plurality of arms, the first frame, and the second frame.

18. The mobility device of claim 11, further comprising a communications module operable to receive commands from a remote location and relay those commands to the control module.

19. The mobility device of claim 18, further comprising an audiovisual system including a display, speakers, a camera, and a microphone.

20. A mobility device comprising:
a body having a first side, a second side, a front end, a rear end, a first frame rotatable about a first axis, and a second frame rotatable about a second axis, the first side opposite the second side, the front end opposite the rear end, the first axis being parallel to the second axis, the first frame and the second frame being rotatably linked such that rotation of the first frame causes simultaneous rotation of the second frame in the opposite direction;

a plurality of arms including a first plurality of arms rotatably supported on the first side of the body and a second plurality of arms rotatably supported on the second side of the body, each arm of the plurality of arms including a wheel, each arm of the plurality of arms being independently rotatable from the other arms of the plurality of arms; and a control module operable to control angular positions of the plurality of arms, the first frame, and the second frame.

* * * * *